US010900768B2

(12) United States Patent
DeWald et al.

(10) Patent No.: US 10,900,768 B2
(45) Date of Patent: Jan. 26, 2021

(54) SYSTEMS AND METHODS FOR ANALYSIS OF MATERIAL PROPERTIES OF COMPONENTS AND STRUCTURES USING MACHINING PROCESSES TO ENABLE STRESS RELIEF IN THE MATERIAL UNDER TEST

(71) Applicant: Hill Engineering, LLC, Rancho Cordova, CA (US)

(72) Inventors: Adrian T. DeWald, Sacramento, CA (US); Michael R. Hill, Davis, CA (US); Eric Summer, Sacramento, CA (US); Brett Watanabe, Sacramento, CA (US); Teresa Wong, Sacramento, CA (US)

(73) Assignee: HILL ENGINEERING, LLC, Rancho Cordova, CA (US)

( * ) Notice: Subject to any disclaimer, the term of this patent is extended or adjusted under 35 U.S.C. 154(b) by 212 days.

(21) Appl. No.: 16/201,994

(22) Filed: Nov. 27, 2018

(65) Prior Publication Data

US 2019/0178624 A1   Jun. 13, 2019

Related U.S. Application Data

(60) Provisional application No. 62/592,240, filed on Nov. 29, 2017.

(51) Int. Cl.
*G01B 7/16*      (2006.01)
*G01N 3/00*      (2006.01)
*G01L 1/00*      (2006.01)

(52) U.S. Cl.
CPC ................ *G01B 7/16* (2013.01); *G01B 7/18* (2013.01); *G01N 3/00* (2013.01); *G01L 1/00* (2013.01); *G01N 2203/0069* (2013.01)

(58) Field of Classification Search
None
See application file for complete search history.

(56) References Cited

U.S. PATENT DOCUMENTS

| 3,943,758 | A   | 3/1976 | Wolf et al. | |
| 6,908,766 | B2* | 6/2005 | Nien ........................ | G01N 1/28 156/309.6 |

(Continued)

FOREIGN PATENT DOCUMENTS

WO   WO2016/140091   9/2016

OTHER PUBLICATIONS

USPTO, ISA/US, "Notification of Transmittal of the ISR and the Written Opinion of the International Searching Authority, or the Declaration," in PCT Application No. PCT/US2018/062910, dated Apr. 29, 2019, 13 pages.

*Primary Examiner* — Natalie Huls
*Assistant Examiner* — Jermaine L Jenkins
(74) *Attorney, Agent, or Firm* — Kang S. Lim

(57) ABSTRACT

Analysis of residual stress in materials is often done in static conditions in a laboratory. Accurate systems and methods for performing these analyses in a dynamic, non-laboratory environment are notoriously difficult and can be very inaccurate. A method using a portable, field deployable apparatus having greater accuracy than currently available is disclosed whereby accurate and repeatable residual stress analysis may be implemented in non-laboratory environments leading to greatly improved diagnostics, maintenance and life limit prediction.

35 Claims, 17 Drawing Sheets

(56) References Cited

U.S. PATENT DOCUMENTS

| | | | |
|---|---|---|---|
| 8,443,545 B2* | 5/2013 | Deppermann | G01N 1/04 |
| | | | 47/58.1 SE |
| 9,897,523 B2* | 2/2018 | Bellemare | G06F 30/23 |
| 10,156,506 B2* | 12/2018 | Okita | G01L 1/00 |
| 10,261,495 B2* | 4/2019 | Ishii | G05B 19/402 |
| 10,551,258 B2* | 2/2020 | Okita | G01N 3/066 |
| 2004/0066503 A1 | 4/2004 | Hubner et al. | |
| 2004/0083024 A1 | 4/2004 | Wang | |
| 2013/0319135 A1 | 12/2013 | Okada et al. | |
| 2016/0258852 A1 | 9/2016 | Bellemare et al. | |
| 2016/0273979 A1* | 9/2016 | Yamada | G01L 1/22 |

* cited by examiner

SYSTEMS AND METHODS FOR ANALYSIS OF MATERIAL PROPERTIES OF COMPONENTS AND STRUCTURES USING MACHINING PROCESSES TO ENABLE STRESS RELIEF IN THE MATERIAL UNDER TEST

CROSS REFERENCE TO RELATED APPLICATION

This non-provisional application claims the benefit of provisional application No. 62/592,240, filed Nov. 29, 2017, of the same title, which application is incorporated herein in its entirety by this reference.

BACKGROUND

A consequence of manufacturing is that when metals are formed, through any method or technique, residual stresses are created in the material that may affect its performance and may be difficult to quantify. It is common to find methods, such as heat treatment, that are used to reduce the magnitude of residual stresses but in general there are almost always some residual stresses after a process or treatment is completed. In some manufacturing processes, residual stresses may be deliberately created. As an example, mechanical surface treatments used to improve fatigue performance, such as shot peening using steel shot or laser peening, build residual stresses into the surface of a material. Chemical treatments such as nitriding, or case-hardening, heating in a nitrogen rich atmosphere so as to build a surface into which nitrogen has been diffused, are common processes. Surface treatment affects only a very thin layer of the metal but this is relied on to reduce or prevent the formation of cracks which become points of origination of failure; typically a crack is an area of extreme stress, or stress riser, which may propagate over time leading eventually to the destructive failure of the component.

Because the practical characterization of material residual stress is difficult, a routine engineering solution is to develop a process which ensures that failure modes or lifetimes are achieved on a statistically significant basis. One consequence of this is that the processes are often stochastic in nature and determined experimentally. It should be evident that building in safety factors supported by low-quality data is costly and fraught with uncertainty; using what are only believed to be representative samples in a laboratory is one example of an uncertainty leading to questionable data. It is clear, then, that an urgent need exists for systems and methods that improve such processes so that accurate residual stress measurements may be made on component parts that have been or will be in use. There is also a need for greatly improved accuracy of machining equipment normally used in analysis work at an economical price point. There is an advantage to being able to do the analysis work in the field, thus avoiding the costs and delays when parts must be shipped to a remote facility. This is especially true where critical components for high value systems are being considered. For example, the consequences of failure of a turbine blade can be catastrophic but detection of failure onset is difficult with current processes. Speed of development is compromised by delays introduced if a component part has to be moved to a remote facility for processing and so the opportunity to be able to bring the analytical process to the part quickly becomes beneficial. A further benefit is that the task of tracking a part is simplified since the part need never leave the facility where it is housed. In some cases, the effort to move a large part, such as a large pipe which may require excavation, is simply impractical and being able to bring the analysis to the part is a far better solution.

SUMMARY

The current invention relates to systems and methods for analysis of material properties of components and structures using machining processes to enable stress relief in the material under test.

Fixed laboratory facilities for the analysis of the residual stress condition of a component are capable of yielding exceptional measurement results, but these are usually expensive to implement, requiring permanent housing and costly handling and documentation processes to support a range of customers.

Measurement of surface residual stress of a material sample can be performed by mechanically removing material locally and then measuring a parameter which is related to the residual stress; typically the change in strain or deformation is measured as a function of the material removed. An implementation of this is commonly achieved by attaching a strain gauge array to the region of interest, drilling a small hole in the part and then measuring the effect of this residual stress release by measuring the change in strain using strain gauges that are radially disposed close to the hole. This typically requires three or more strain gauges to be applied to the material, recording accurate position and angle data for their location and then mathematically deriving the residual stress due to the resultant strain, relative to a predetermined axis in the material. Current technology incorporates these three strain gauges onto a single substrate that may be attached as a single part; the array generally has two gauges orthogonally positioned with a third at 45° relative to the other two. As is normal practice, each gauge element incorporates center-line marking that facilitates alignment and allows the residual stress to be calculated in any direction on the plane using well known mathematics.

One of the better known and widely used techniques for measurement of near surface residual stress requires a small hole to be accurately drilled in the center of the strain gauge array, which relieves local residual stress and the resultant strain which is measured is related to the change in residual stress. The term "center" refers to the point of intersection of the marked axes of the gauge array's elements and in this case the strain gauge is sometimes referred to as a rosette. The elements in this case are either radially disposed around the center in a whole circle or else radially disposed in one quadrant of a whole circle. The hole is generally made to have a depth which is equal to one half of its diameter. Another technique involves cutting a slit of predetermined depth across a representative face of the material measuring the strain change due to slitting, and then calculating residual stress from measured strain.

Typically, a component part would be received at a laboratory and then be sectioned or cut so as to allow the element of interest to be accurately positioned on a machine that would be used to either drill a hole or cut the slit. The more that a part is handled, the greater the chance of altering the residual stress in the part to be tested. Further, jigging and clamping of the sample introduce other forces that apply stress to the part. Prior to machining, the element that will be analyzed must have a strain gauge applied, which typically means that the location at which the gauge is to be applied must be cleaned so that the adhesive used to secure the gauge, or gauge array, will be effective. Wires are then connected so that the reference value may be measured and recorded. A typical measurement uses the strain gauge element as part of a Wheatstone bridge array, which is well known in the measurement art.

Once the initial reference values have been established, the part may be aligned in preparation for the cut. Once machining is completed, the part may be removed from the machine and the new strain gauge readings taken; in some cases this measurement may be done in situ. The differences between these new strain values and the reference values previously established correspond to the residual stress values before the machining process relieved the residual stress that was initially present.

It is clear that there is a need for an appliance that is not entirely dependent on a laboratory environment for producing very high quality results. There is also a clear need for improved accuracy of existing equipment. The objective of this invention is to improve the accuracy beyond what is currently available, to mitigate the need to cut larger test pieces so that they may be fitted to a machine for cutting the residual stress relief feature, to improve the quality of residual stress measurements through development of a single integrated appliance, to develop an appliance to perform slitting or slotting, hole drilling, ring core cutting of an annulus or more complex feature such as an intersection of slots (such as a plus sign) or to simplify or speed the measurement procedure. By taking advantage of the advancement in computer technologies and advanced materials for the creation of an appliance that may be moved to the part under investigation, a considerable benefit is realized. The appliance may be made highly portable for direct attachment to the test piece or can be used as a bench machine at the temporary location.

Note that the various features of the present invention described above may be practiced alone or in combination. These and other features of the present invention will be described in more detail below in the detailed description of the invention and in conjunction with the following figures.

BRIEF DESCRIPTION OF FIGURES

In order that the present invention may be more clearly ascertained, some embodiments will now be described, by way of example, with reference to the accompanying drawings, in which.

DETAILED DESCRIPTION

Figure 1A:
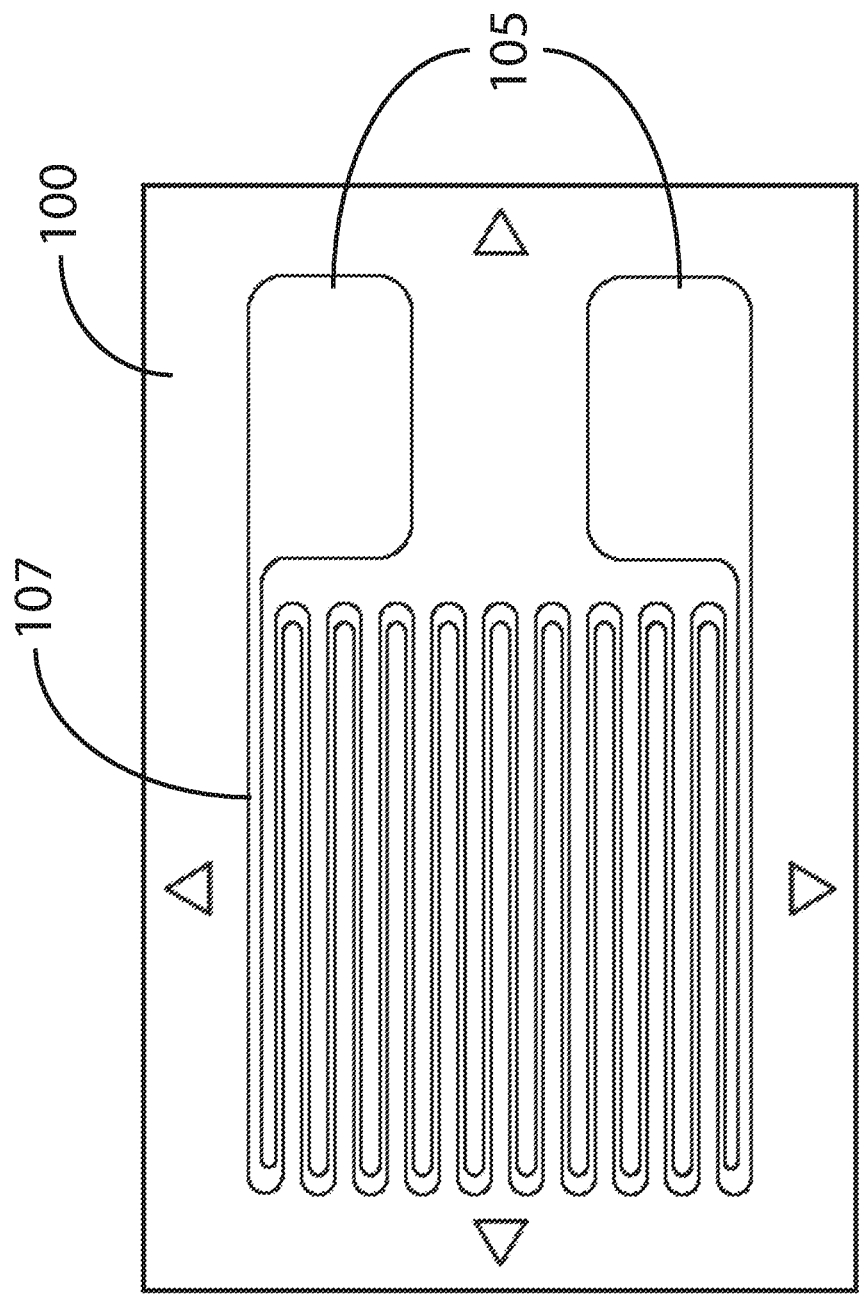
FIG. 1A shows the plan view of a single strain gauge with alignment marks.

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

Aspects, features and advantages of exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute and/or sequential terms, such as, for example, "always," "will," "will not," "shall," "shall not," "must," "must not," "first," "initially," "next," "subsequently," "before," "after," "lastly," and "finally," are not meant to limit the scope of the present invention as the embodiments disclosed herein are merely exemplary. Conversely, terms such as "can" or "may" are used interchangeably and are intended to describe alternative and/or optional features, i.e., may not be necessary or preferred, for the disclosed embodiments.

Methods and apparatus will now be described which facilitate automated residual stress measurement in a material sample in a laboratory or on site, without requiring the material to be relocated to another facility.

One or more locales may be selected at which measurements are to be made. In the case where strain gauges are to be used, after cleaning and attaching a strain gauge or strain gauge array to one or more measurement locales, appropriate to the measurements intended, the one or more strain gauges or arrays may be connected to a measurement device which allows the starting strain to be recorded. Because a newly applied strain gauge is not displaced from its starting value of resistance, this is effectively the zero point from which subsequent measurements may be referenced. In one implementation, the strain gauge may be coupled to an analog to digital converter so that the measured data may be recorded as a machine readable file and used subsequent to the completion of any of one or more machining processes to yield a set of associated strains. The residual stress condition of the material may be calculated corresponding to each of the one or more machining steps and the results presented in numerical or graphical form. Other methods using optical technologies may be used to make strain measurements.

In some embodiments, a small slot can be cut into the surface of the material. This slot may have a predetermined form and be cut normal to the surface at the point of the feature. The plane of the slot is, preferably, aligned orthogonally to the sensitive direction of the strain gauge when a single gauge is used, but when a rosette array is used this is a lesser concern. In areas of significant curvature, the machined feature may be angularly offset by a small amount according to the compensation rules that an inspector assigns to the analysis.

In a simple implementation, the apparatus comprises a linear slide, mounted to a base plate that may be accurately positioned relative to the strain gauge or relative to a particular feature on the test material. The slide may be moved with high accuracy relative to the base plate along the direction of the slide. This positioning may be done, preferably, using a linear actuator though other methods that are known to those having ordinary skill in the art may be employed.

A machining tool is mounted to the slide so that its position, normal to the slide which preferably moves parallel to the work surface, may be adjusted. In one implementation the machining tool is a high speed motor and a cutting tool is coupled to the motor spindle, the tool being selected to cut the sample material appropriately. The motor mounting may be on a vertical slide whose position may be controlled by a linear actuator so that progressive cuts may be made under automatic control. Thus the cut width may be set by choosing the diameter of the cutting tool and the depth of cut set by advancing the slide upon which the motor is mounted. The slide which is attached to the base plate may be moved and, in this way, a linear slot of predetermined width and alterable depth and length may be cut into the material so that the residual stress present in the neighborhood of the gauge or gauge array is interrupted from the residual stress in the bulk material. Other methods may be used for material removal, such as electric discharge machining; EDM techniques allow for very fine feature erosion.

By adding a second slide that moves in the same plane as the base plate, and coupling the motor slide to this, instead of the first slide, the cutting tool may be moved in three dimensions and, provided the actuation steps are small enough, a slot having a complex profile may be cut. In one implementation, a strain gauge is mounted and a circular or annular slot is cut so that the resulting island upon which the strain gauge array is now mounted is isolated from the bulk material. Of note, cutting an annulus in this way significantly reduces the tool chatter at the floor of an annular cut which is caused by the failure to adequately clear the material chips; the use of a fast milling cutter clears chip residue effectively. Other features such as an intersection of slots or slits or more complex shapes may be cut into the material. In one implementation a cut geometry is formed from a symmetrical pair of intersecting cuts yielding a feature shaped like a "plus" sign.

To facilitate accurate positioning, an optical component may be used. In one implementation a camera is located so that its view axis is in the plane of the cutting spindle and approximately parallel with the spindle. In this way, the distance offset between a point defined by an optical graticule attached to the camera and the center of the cutting tool may be determined and this offset calibration factor applied to the control electronics so that once a point is located, then the tool may be moved to the same point so that a cut may be performed based on that reference. Simple trigonometry may be used to compensate for misalignment errors using a test coupon to make this determination. The cutting tool may be aligned to the strain gauge or to a feature on the test specimen by an operator or automatically using automated feature detection.

In a second implementation, a fiber optic component is used so that the camera element may be remotely located. Modern camera components are highly miniaturized and, provided that the viewing lens is protected or shrouded from metal debris that results from the cutting action of the tool, may be located close to the cut axis. A second camera may be attached so that the cut may be monitored live at the time of cutting.

A third implementation incorporates a profiling tool that allows the machine to develop an accurate profile of the part to be machined so that the machining features may be complex and not limited to simple cuts in the z-axis. For reference, the x-axis and y-axis are defined to be in the plane of the base plate of the machine and the z-axis is that axis orthogonal to that plane. It should be evident that the use of Cartesian (x,y,z) coordinates are purely for ease of description and circular (r, θ, φ) coordinates may also be used. The profiling tool may be a conventional mechanical tool, or may be implemented using the automatic focusing function of a camera fitted to the appliance. This latter capability also allows very accurate control of the depth of a cut either relative to a particular feature or to the neighboring surface profile; for example in a test sample having a curved surface, the floor of the cut may be positioned at an exact dimension below the surface. In one application, a slot is cut having the material opposite the side on which the strain gauge is placed removed in a staircase fashion, so as to approximate a smooth sloping transition. A similar aspect allows a slot to be tapered at the ends. In both cases the transition may be linear or have exponential characteristics to the slope.

Refer first to FIG. 1A which illustrates a typical strain gauge 100. In this example the strain gauge is aligned lengthwise along the axis whose displacement is to be measured. Electrical connections are made to the two contact pads 105 and the resistance of the track between them is measured. Strain, the movement of a material, applied in the long direction stretches the conductor 107 joining theses pads, which increases its resistance. Similarly a strain that shortens the conductor, by compressing it, yields a reduction in resistance. These changes are small and often imperceptible to the unaided eye, but can be measured, electronically. This change in resistance may be related to the extension or contraction using calibration curves or calibrated using known forces applied to the material under test.

Figure 1B:
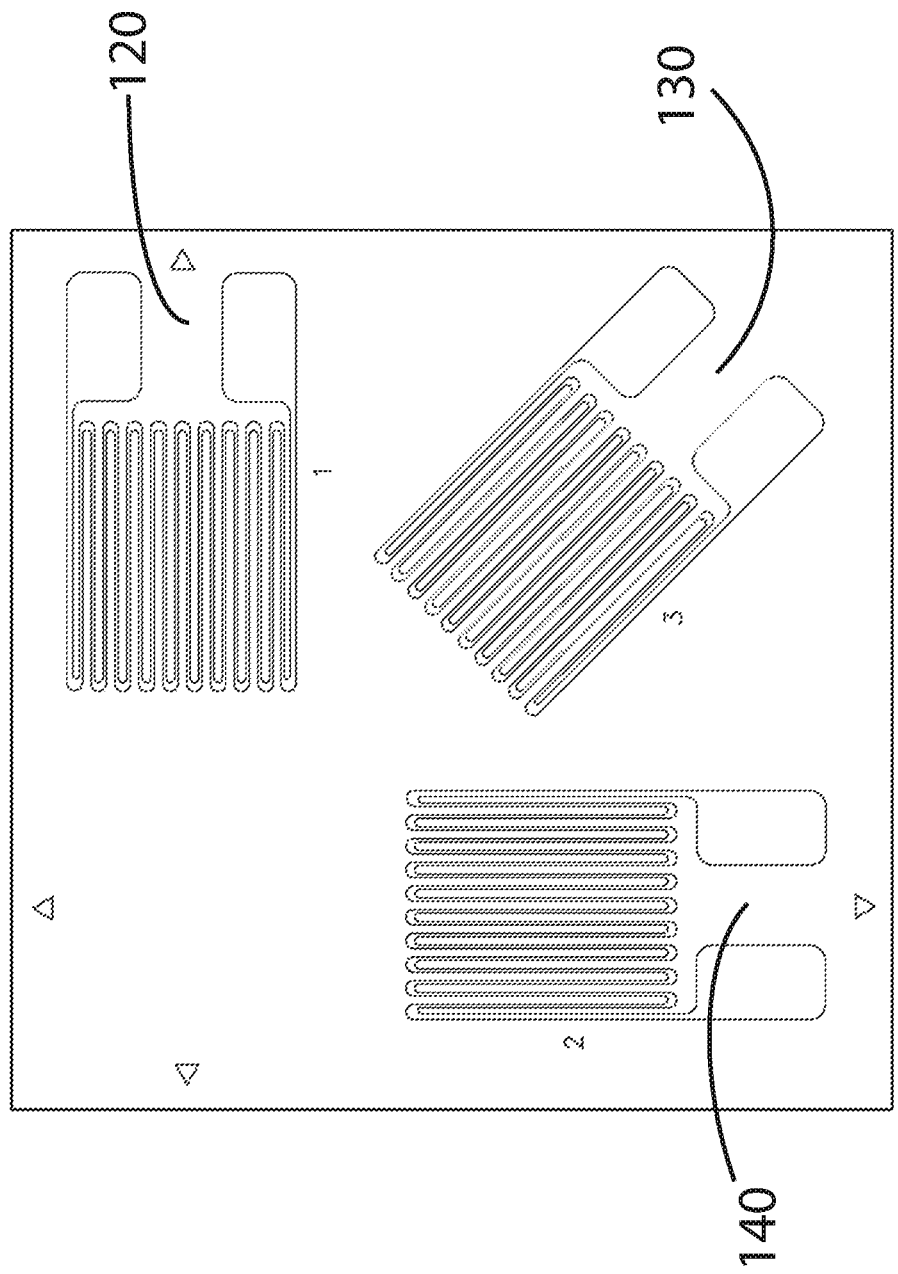
FIG. 1B shows a single quadrant rosette version of a strain gauge.

FIG. 1B shows an array of three strain gauges 120, 130 and 140 aligned so that the extension axis of each is along one of a 0°, 90° and 45° line, respectively 120, 140 and 130. By using an array of this type, having three independent gauges accurately aligned, the strain in any direction may be resolved mathematically. The strain gauges rely on the property that as a material is stretched, its resistance becomes greater in response to the material getting thinner.

The reverse is true when the gauge element is compressed and the resistance gets less. Thus when a stress is applied to a material, there is a corresponding displacement (the strain) which displacement may be measured as a resistance change in a strain gauge. It is important to note that these changes, in a typical application, are very small changes indeed, commensurate with the tiny displacements that occur.

Figure 1C:
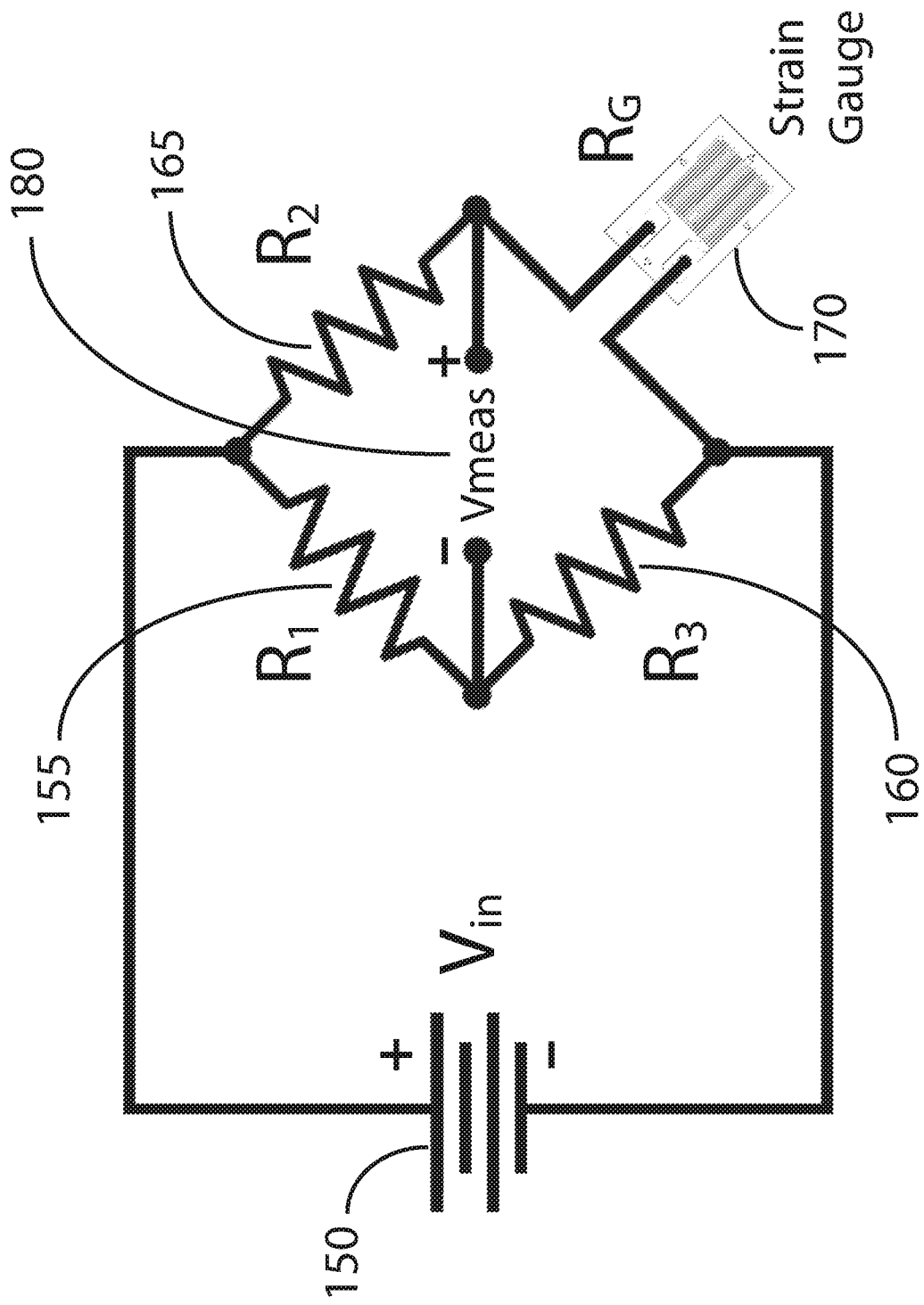
FIG. 1C illustrates a typical simplified Wheatstone bridge.

Conventionally, a Wheatstone bridge is used to determine the resistance of the strain gauge by measuring an imbalance that is caused when the bridge element changes its resistance. FIG. 1C shows such a bridge having a single variable element 170. A voltage 150 is applied to each of two resistive dividers that are nominally equal. Although the polarity of the applied voltage should have no effect upon operation, it is ideal to ensure that excessive current does not flow; heat is produced when current flows and causes a temperature rise in the elements which causes a change in resistance of the elements. This effect reduces the accuracy of the technique and so it is important to minimize variations in temperature between the elements forming the bridge, which is best achieved by keeping the driving voltage to a value that provides sufficient sensitivity without excessive drift along with some effort to hold a constant temperature between elements. The ratio of resistor R1 155 to R3 160 is set to be equal to the ratio of resistor R2 165 to the resistance of the strain gauge RG 170. The voltage at the junction of R1 155 and R3 160 will be equal to the voltage at the junction of R2 165 and RG 170 so the measured voltage Vmeas 180 will be zero; in practice, it is routine to have one of the fixed resistors alterable or able to be trimmed to account for discrepancies due to manufacturing tolerances and the resistance of the wires that are used to connect the strain gauge. A change in the gauge's resistance value will now unbalance the bridge so that a non-zero voltage will exist at 180. An amplifier may be used to make the bridge very sensitive to changes in the gauge resistance due to changes in strain. Exceptionally fine resolution may be achieved and this has been a standard measurement technique since the early days of electrical engineering.

In this embodiment, one or more strain gauges may be applied to the test site on the component that is intended for analysis. The strain gauges are usually applied to a cleaned area of the material under test using a good quality adhesive; strain gauge manufacturers will provide guidance on which adhesive should be preferred but perfectly adequate results are usually obtained using fast drying cyanoacrylate glues.

Figure 1D:
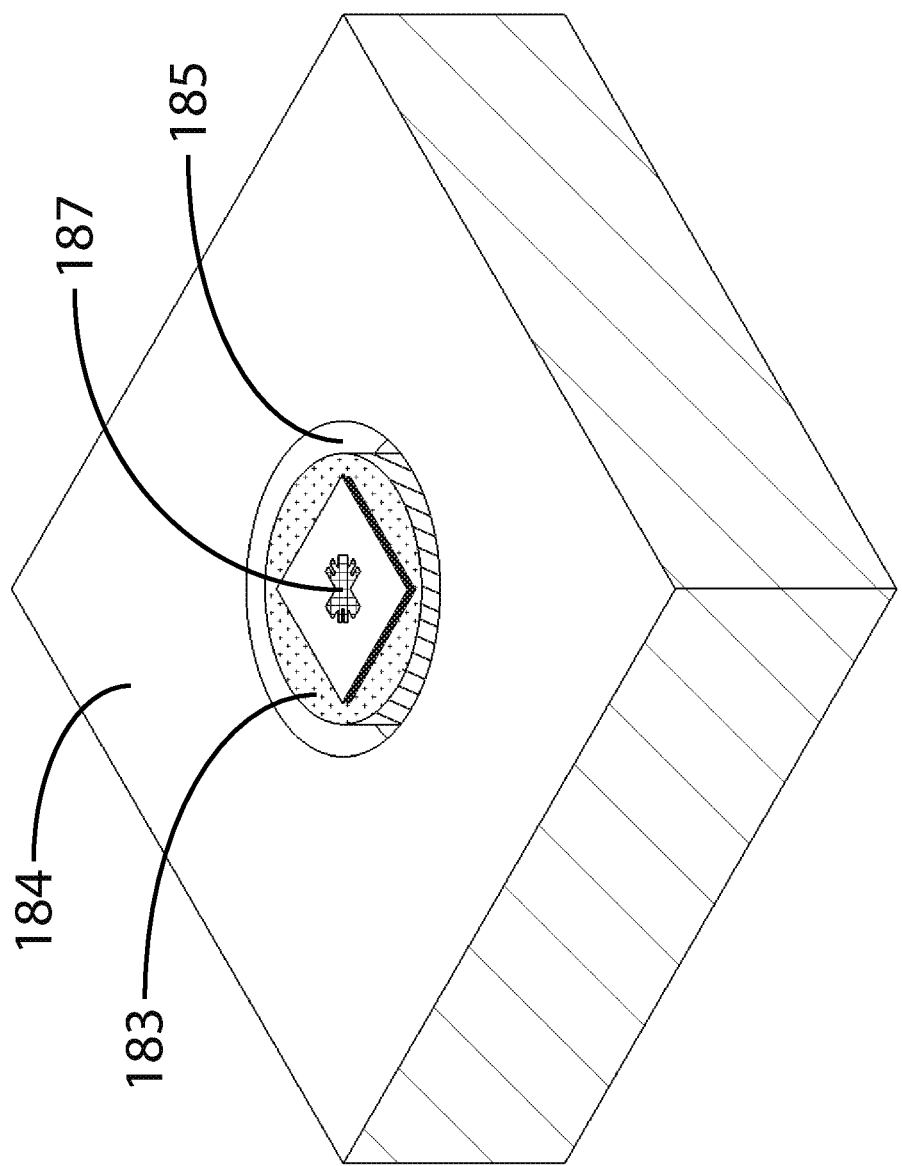
FIG. 1D illustrates a strain gauge attached to a test piece, where an annulus has been machined to isolate the gauge area from the bulk material.
Figure 1E:
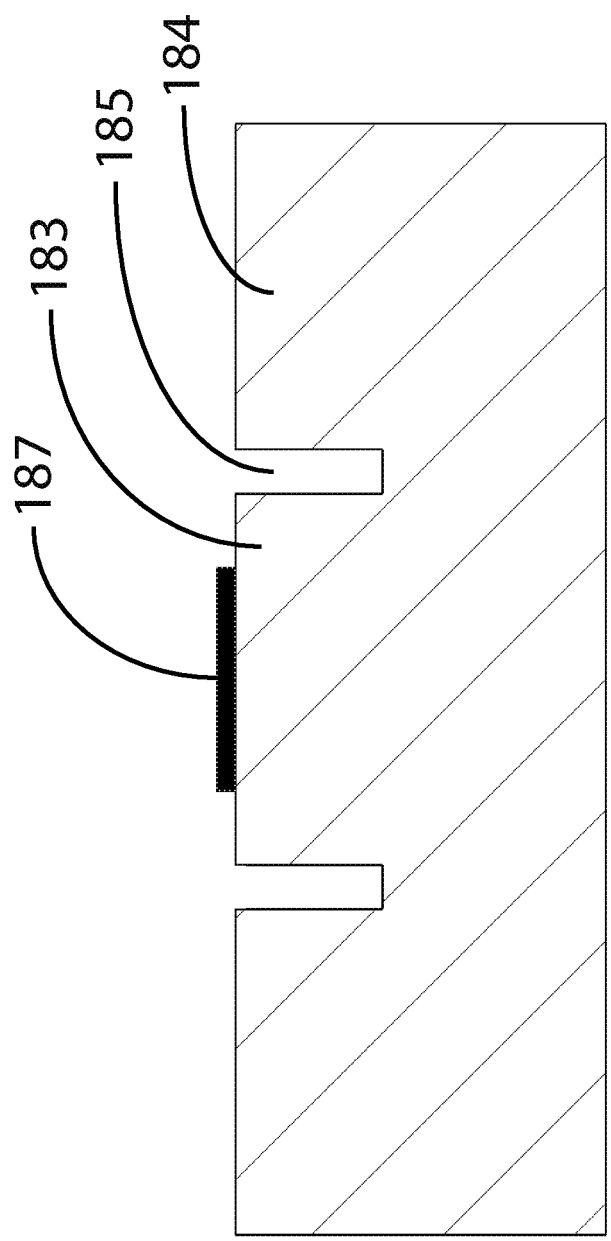
FIG. 1E illustrates the annulus of FIG. 1D in profile view.
Figure 1F:
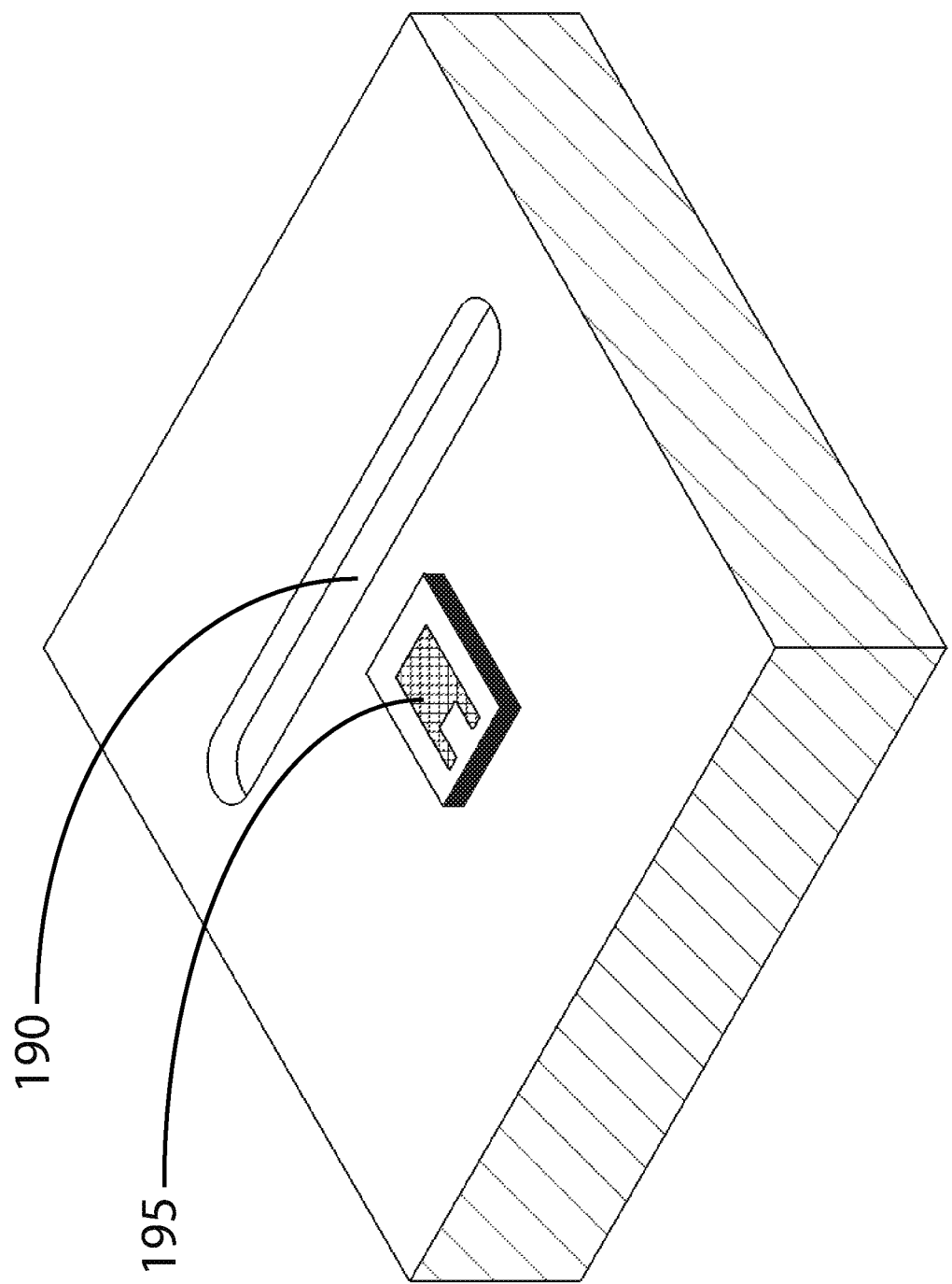
FIG. 1F illustrates the case where a strain gauge is attached to the test piece and a linear slot has been machined to release residual stress.

Turning to FIG. 1D, an annular slot 185 is shown machined proximate to the gauge array 187. For ease of viewing the illustration shows a representative single gauge but this may be a gauge array allowing resolution of the strain in any direction. This machining releases the residual stress that was stored in the material surface as it is essentially disconnected from the bulk material 184, forming a small island 183 upon which the gauge is mounted, and is now free. FIG. 1E shows the structure of FIG. 1D as a cross section; the vertical dimensions are exaggerated for clarity and are not representative of an actual sample dimension. FIG. 1F shows a second method of machining that interrupts stress in the area to be measured from the stress in the bulk where a linear slot 190 is cut so that the strain gauge 195 or gauge array records the change in strain as the residual stress near the slot is interrupted from the bulk material. Conventionally, residual stress release has been achieved by simply drilling a hole at the intersection of the three axes of a strain gauge array and this machine is capable of performing this operation as well; this is not illustrated because it is well documented in the art.

Figure 1G:
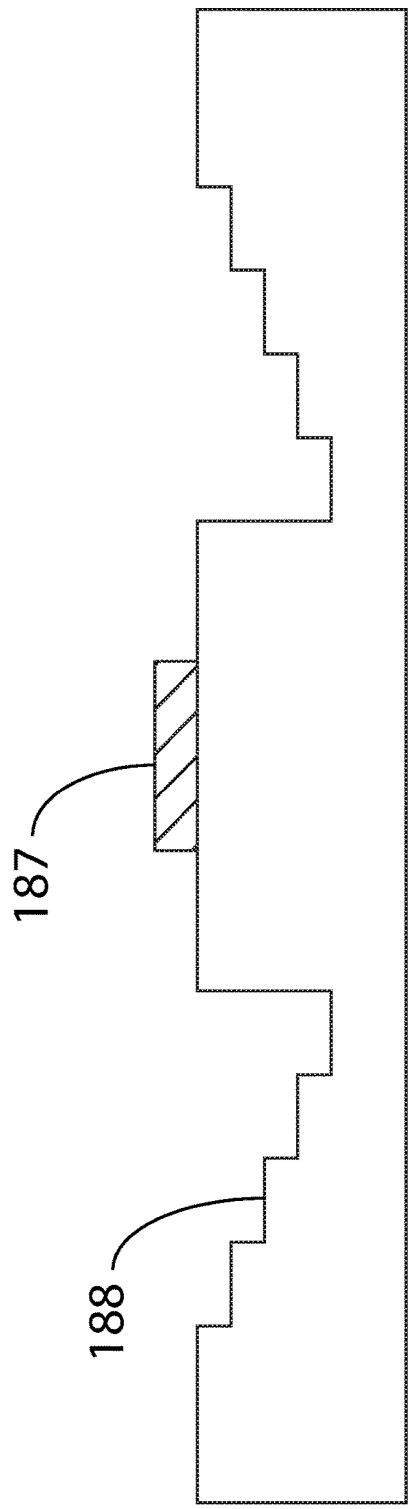
FIG. 1G illustrates a cut profile having a linear staircase appearance to facilitate chip clearing.
Figure 1H:
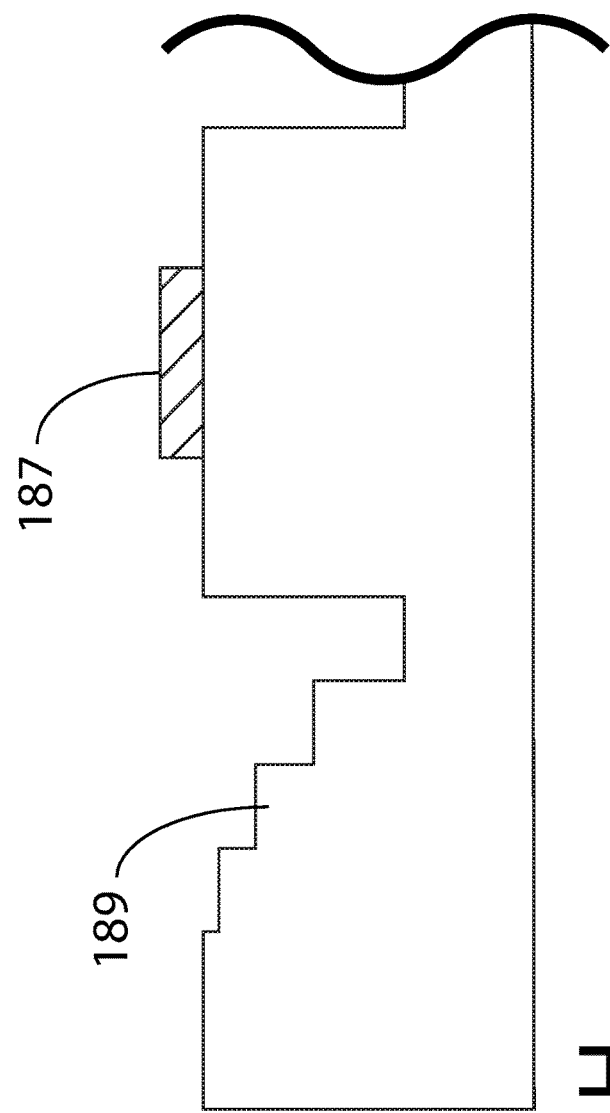
FIG. 1H also illustrates a cut profile having a non-linear staircase appearance.

FIGS. 1G and 1H illustrate a cut where the transition is only steep at the edge of the cut proximate to the strain gauge 187. The opposite side of the cut transitions more gradually; a staircase appearance 188 or 189, with two or more steps, is simple to machine and with a reasonable selection of step size very closely approximates a smooth transition. The step sizes may be equally spaced 188 or otherwise, e.g., a simplified exponential relationship 189 as shown in FIG. 1H. In similar fashion, not shown, the ends of a slot may also be cut this way. A significant benefit is that chip removal is facilitated and there is a greatly reduced tendency for the cutting tool to bind or spall in the cut, especially with softer materials. Although the figure illustrates a convex shape where the step-cutting depth increases as the transition is approached, it should be clear that it is equally practical to make the step cutting depth reduce as well giving a concave shape. Either method of producing an exponentially progressive transition is acceptable.

In one implementation, strain measurements are made using an optical system comprising a well defined light source such as a laser or array of lasers and one or more detectors. Other implementations may use a system of digital image correlation to determine the change in strain, or displacement, or else electronic speckle pattern interference may be used. Other strain or displacement measurement methods may be used. The temperature of the sample under test may be measured using the characteristics of a thermistor, a thermocouple or else be sensed optically and incorporated as a function of a camera fitted to the appliance.

Figure 2A:
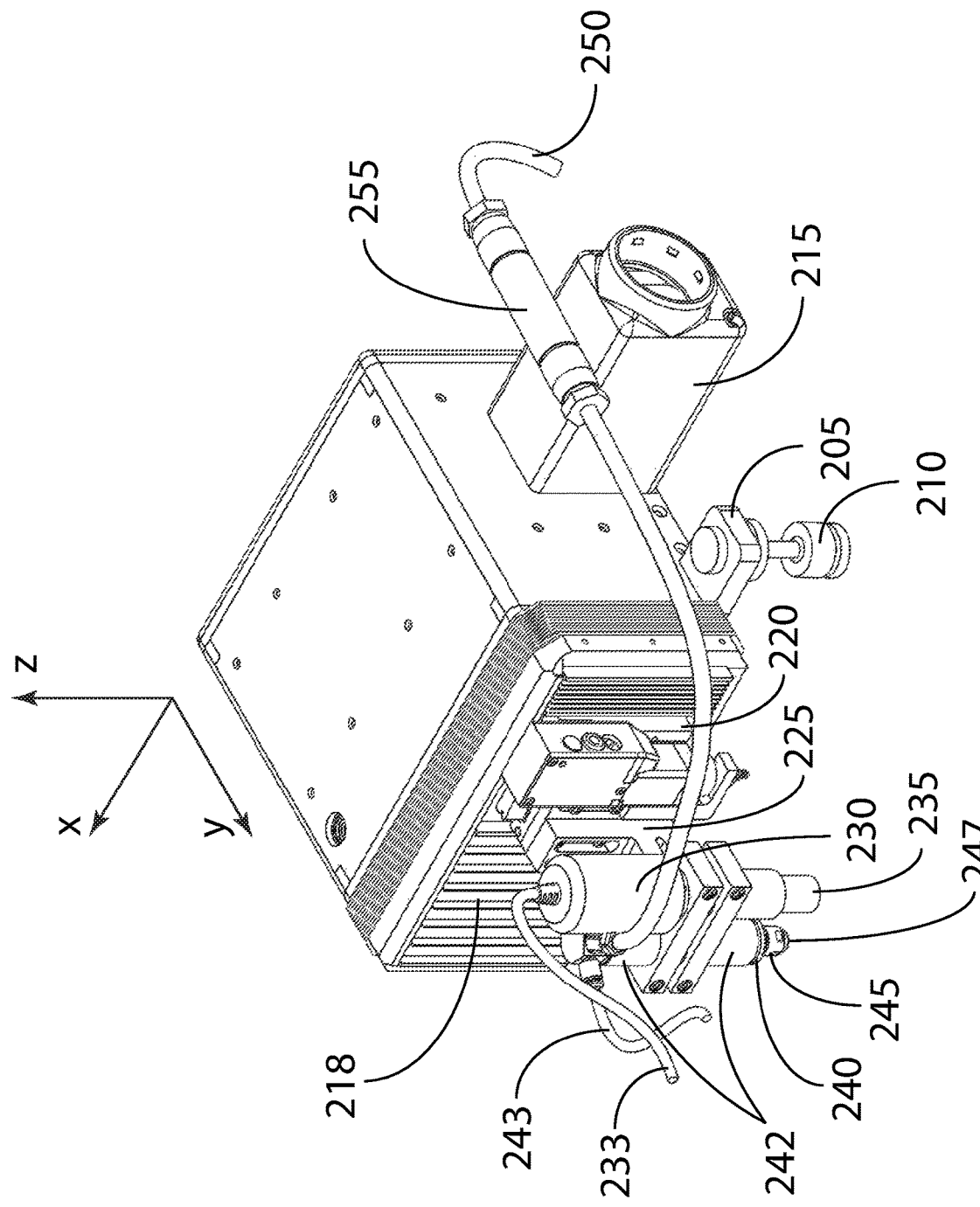
FIG. 2A illustrates one embodiment of a machine and identifies areas of interest in accordance with the present invention.

FIG. 2A illustrates one embodiment of a machining appliance in accordance with the present invention. The machine components are assembled to a base plate 205 which is equipped with typically three feet 210 so that it will be stable in most configurations. In one implementation, all three of the mounting feet 210 may be adjustable so that the base plate may be made parallel to the part, or test sample, which is to be machined; although this is not strictly necessary, since in another implementation the machine is able to accurately track the surface of the part, it is useful for simpler tasks having few if any complex curves. When the machine is able to map the surface of the part to be machined, two or more of the feet 210 may be adjusted automatically using suitable actuators so as to align the machine relative to the desired machining area.

The x-axis drive motor is shown at 215. This is a linear actuator and may assume any of a number of forms. Typically this will be a stepper or servo-motor that turns a ball screw, or lead screw, which in turn drives the platform that bears the movable parts of the machine along the x-direction. Drive motor 215 is selected for its ability to develop high torque coupled with accurate positioning. In the case that the motor 215 is a stepper motor, an electronic controller delivers properly phased power to drive the motor at the defined speed and direction so that the moving platform may be positioned as required. To protect the precision actuation mechanism used for any of x, y or z motion, it is preferred if such mechanisms are enclosed. To allow for free motion, sliding panels or bellows as shown at 218 prove effective for this purpose.

Not shown in detail in this figure, are the motors that drive the machine in the y and z directions. Linear precision slides are used to allow parts to move relative to one another. Typically these may be supported on ball bearings so as to minimize sliding friction and to reduce the stiction, or static friction which is undesirable because it compromises accuracy of small displacements. Well lubricated gibs are often used where rigidity is needed in a slide and permit an adjustment point to take up any wear but are less necessary in a miniaturized appliance because the loads are generally quite small. In practice, this appliance when properly adjusted at the factory should require little if any additional maintenance beyond lubrication. A component of the y-axis slide 220 is shown only in part. A section of a typical slide is shown later in FIG. 3.

The mounting assembly 225 which attaches the machining components to the three-dimensional motion platform may be adjusted in a series of predetermined steps. This allows the mounting assembly to be extended or offset in the z-axis so that the z-axis travel is not required to be extensive. Continuously variable mounting can also be used but provision must be made for limiting the risk of slippage or misalignment; one method for achieving this is to use a screw assembly for adjusting this position or adjusting a stop that prevents further movement of the mounting assembly. This is especially useful where a feature of the material to be machined might otherwise intrude and limit the z-axis motion. The mount may be attached in various orientations so that machining may be performed in other than normal positions and is illustrated in more detail in FIG. 4A. This might allow, for example, a feature to be cut in a vertical part of a test sample without having to re-orient the sample. A variety of mount configurations are possible and provided that they are not so massive as to tax the machine driving mechanisms allow for a good range of machine reach.

A camera 230 is mounted so that it is a defined distance from the machining location. Power and signal are delivered by means of a cable 233. The camera position offset from the machining point may be calibrated by machining a spot and then moving the camera under manual control so that the image of the machined spot is centered in a graticule. The difference between the starting position of the camera that corresponds to the machining action and the position where the aspect is centered in the camera visual field represents the camera offset. This offset may be stored as a computer constant and when a feature is identified visually, the machine tool may be moved to the point by simply adding or subtracting this stored constant as appropriate. To protect the lens of the camera, and to improve contrast in the image, a lens hood or shroud 235 may be fitted. Optionally a source of illumination may be collocated with the shroud or added externally. The light source may be monochromatic or polychromatic. By using light emitting diodes of various colors, the image quality may be optimized.

A high speed motor 240 which drives a cutting tool installed at 247 is mounted to the motion platform so that the cutting tool may be moved to the sample and a programmed cut made according to the intended feature. Preferably the spindle speed should be high; in one implementation, this speed ranges from 10,000 to 100,000 rpm so that the optimal cutting rates may be achieved. A collet or other tool-mounting device 245 is located at the end of the spindle. In most applications a carbide-tipped end-mill is sufficient to perform the machining actions; the cutting tool will usually be determined by the application and the material to be cut. Motor power is supplied through a connection 243.

To avoid the need for coolant or lubricant at the point of cutting, very light cuts may be taken, in the neighborhood of a few ten-thousandths to a few thousandths of an inch (in one application the optimal cut is about 0.004 inches or approximately 100 µm) per cutting pass. This of course will mean that numerous passes will be required in order to achieve a reasonable depth to provide sufficiently accurate information. Working depths of approximately 5 mm are generally adequate for either a slot or a hole depth, though this may be determined by considering the material and other pertinent information. In the absence of or in addition to a coolant, chips, the debris resulting from cutting action, can be removed using an air blast from a nozzle that blows on the cutting tool; this is not shown in FIG. 2A to avoid cluttering the drawing with supporting detail.

At the high spindle speeds used in this embodiment, significant currents are applied to the motor when under load. This results in heat being generated in the motor itself from both the I2R losses in the windings as well as eddy current or iron losses. This heat, though not particularly injurious to the motor, presents a potential burn hazard for an operator, so the motor may be fitted with a shroud 242 to which airflow is directed. This cooling air 250 may be piped to a filter 255 to remove any contaminants that may be present. If other than dry clean air is passed over the motor, then a residue may be trapped or deposited on the motor housing and may act as an insulating barrier that would significantly increase the operating temperature of the motor and might cause accelerated failure. Typical contaminants from compressed air include water, oil and debris all of which are best removed. Although factory compressed air is often available, simple air pumps will also suffice in general, but these too will contain dust and dirt particulates that may hamper successful operation and so some simple cleaning action is preferred. The cooling air can be simply exhausted from around the motor shroud and does not have to be directed or channeled.

Strain gauge arrays as shown in FIGS. 1A and 1B have large connection pads that facilitate the attachment of wires for connecting the gauge element or elements to a measurement appliance. Typically, this connection is made by soldering the wires to the pads. To facilitate a good electrical connection between the gauge material and the point at which a user will make a connection to the measurement system, and also to prevent corrosion, the connection pads may be given a thin coating of gold during manufacture that prevents oxidation. Such coatings are not particularly durable and will not survive harsh treatment, but with reasonable care they may be suitable for use with automatic probing equipment. This leads to an opportunity for a probe station to be fitted to the machine of FIG. 2A so that, as machining progresses, the probes may be applied to the gauge and measurements taken and recorded at intermediate points in the machining. As machining progresses, the measured strain moves asymptotically towards a value where further machining causes no significant change in strain. At this point machining may be discontinued which leads to an efficiency improvement not seen elsewhere. The very fine cuts performed at high speed are minimally intrusive and generate very little additional stress in the part which makes this a good strategy, in contrast to the heavy cuts seen with traditional methods. Further, an annulus cut in this way is found to less intrusive than that cut using a coring drill. Tool chatter during machining is greatly reduced because a coring drill is quite inefficient at removing chips created as a result of the cut, in addition to the risk of spalling at the sides of the cut as chips get trapped between the tool body and the material being machined, even when the cutting edges have substantial clearance.

Figure 2B:
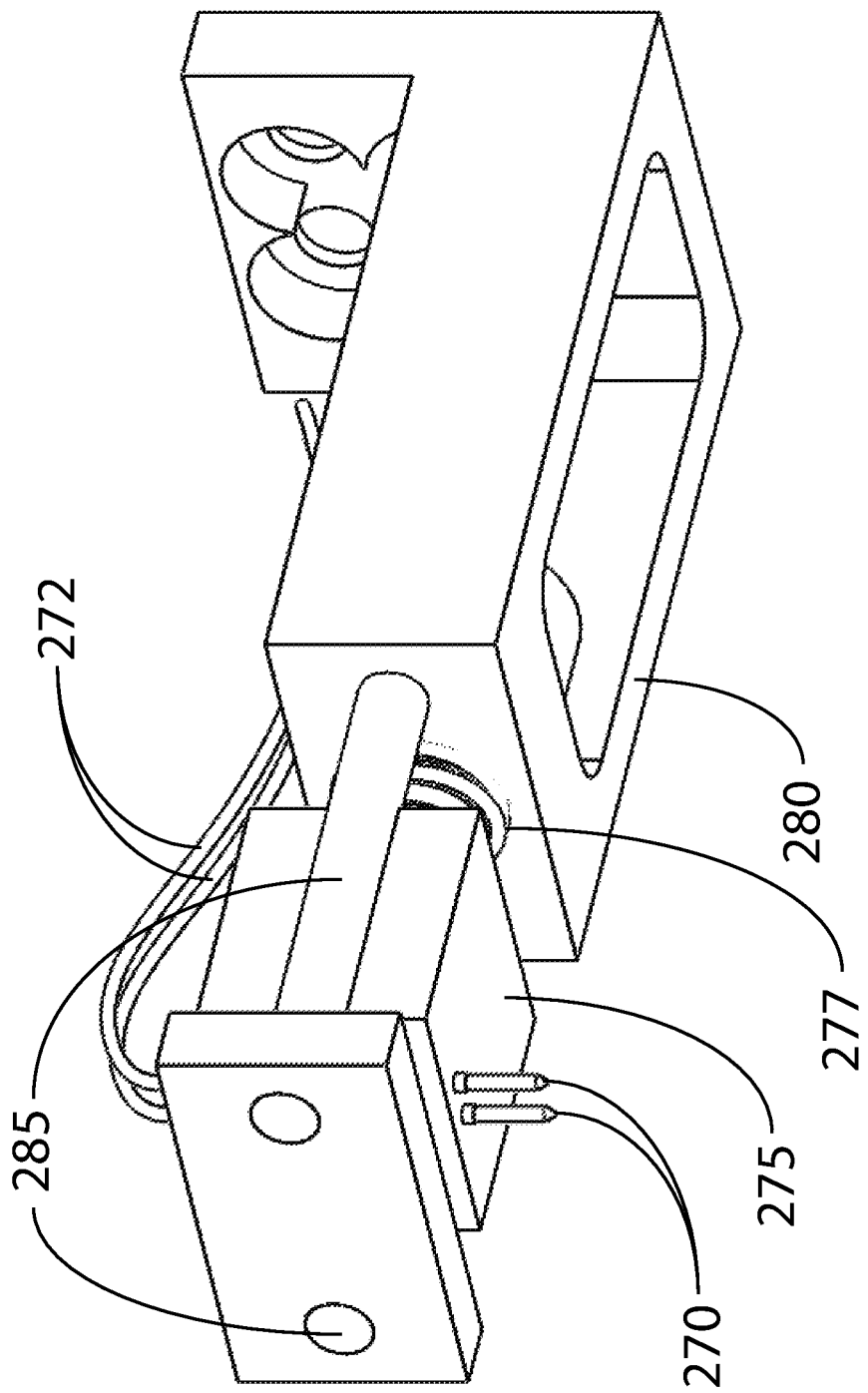
FIG. 2B shows a simplified view of a typical probe assembly having a single axis of adjustment.

The measurement probes may be of any suitable type. The semiconductor and measurement industry are consumers of such probes and these may be easily acquired. Ideally the probes are coated to reduce corrosion problems, e.g., gold-plated, palladium-plated or chrome-plated, and have changeable contact elements so that damaged parts may be replaced. The probe station may be attached to the same mount 225 as the camera 230 and motor 240. FIG. 2B shows an illustrative probe assembly for a single probe connection. The contact component 270 is made from a material that resists corrosion such as a palladium alloy or a gold plated conductor. A spring is normally incorporated in the contact pin assembly that allows pressure to be applied to hold the pin in contact with the contact pad on the strain gauge. The pin retainer 275 is made of a non-conductive material and is held to the mounting 280 by screws 285. Spring 277 ensures that the probe system remains secure in operation. The pins 270 are connected by means of wires 272 to the measuring apparatus. Not shown is a retraction system that allows the probe assembly (usually two or more probes are used depending upon the number of strain gauge connections to be made) to be lifted from the strain gauges whilst machining is in operation. In use, the probe contact system is moved into contact with the gauge contact pads and a starting measurement taken of the gauge starting value or values. A record is made of the position of the motion platform whilst the fine relative position is adjusted; this may be a manual adjustment which yields the simplest implementation of this system. The probes are then retracted and the camera is used to center the gauge reference points. The offset between the camera and the probe position or positions may now be recorded and stored. Machining may take place as described earlier and, after a predetermined number of cutting passes, the probe station can be returned to its contact position over the gauge or gauge array, the probes extended to make contact with the gauge or gauges and a measurement taken. Absent any contamination, repeated measurements can be made; occasional errors in measurement which occur as a result of wear on the connection pads of the gauge from repeated contact by the probes are easily dispatched by indexing the probe position by a small amount so as to touch a different part of the contact pad.

Figure 3:
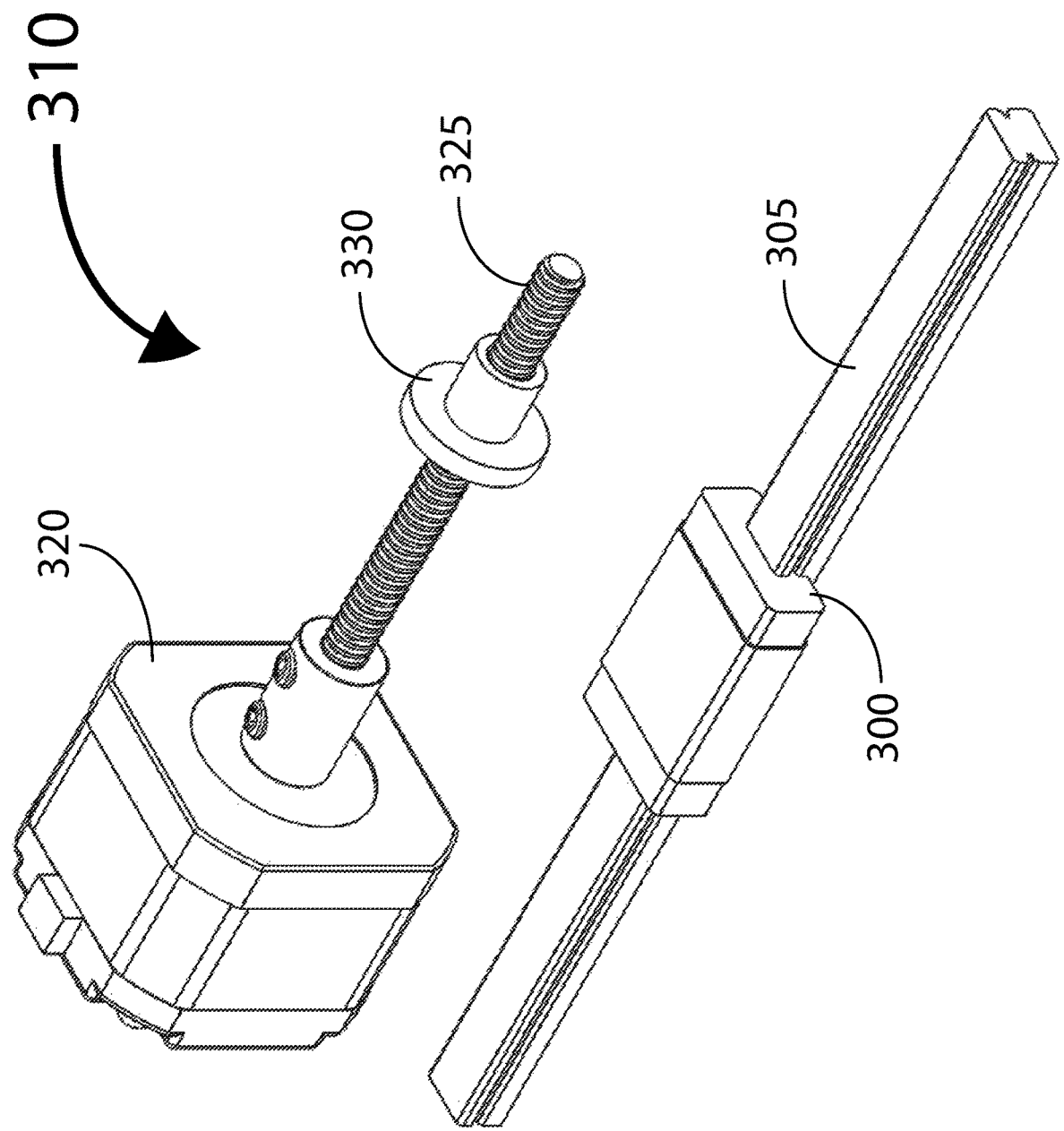
FIG. 3 illustrates one of the moving parts of the machine and its drive mechanisms.

FIG. 3 illustrates the construction of the slides 300 and the drive mechanism 310. The slides are designed to move freely in one axis and to resist motion in the other two axes. The slide 300 fits to a rail 305 using a tongue that mates to a groove; the slide can have tongues on both sides and the rail grooves may be on both sides. These can be augmented with adjustable components that enable wear to be taken up, but for precision machines such as this it is preferable to replace worn parts with new parts. In one implementation, the drive mechanism 310 is operated by a stepper motor 320 which is chosen to have steps of 1.8 degrees which corresponds to 200 discrete steps per rotation. The pitch of the lead screw 325 that drives the slide mechanism is chosen so that one complete revolution moves the slide 320 by 1.2192 mm or 0.048 inches. The drive nut 330 is attached to the slide assembly whereas the driving motor 320 is attached to the body of the machine. Not shown are bearings that can be fitted to stabilize the driving screw in either or both of position or thrust. The driving motor 320 can be selected to have bearings that can support sizeable thrust loads and so the far end of the drive screw may need little additional support. Although both X and Y directions may have the same drive components, these do not have to be identical. The vertical or Z direction can also be of a dissimilar nature, except that it is preferred if it is of a fine pitch so that incremental cuts may be precisely managed.

Figure 4A:
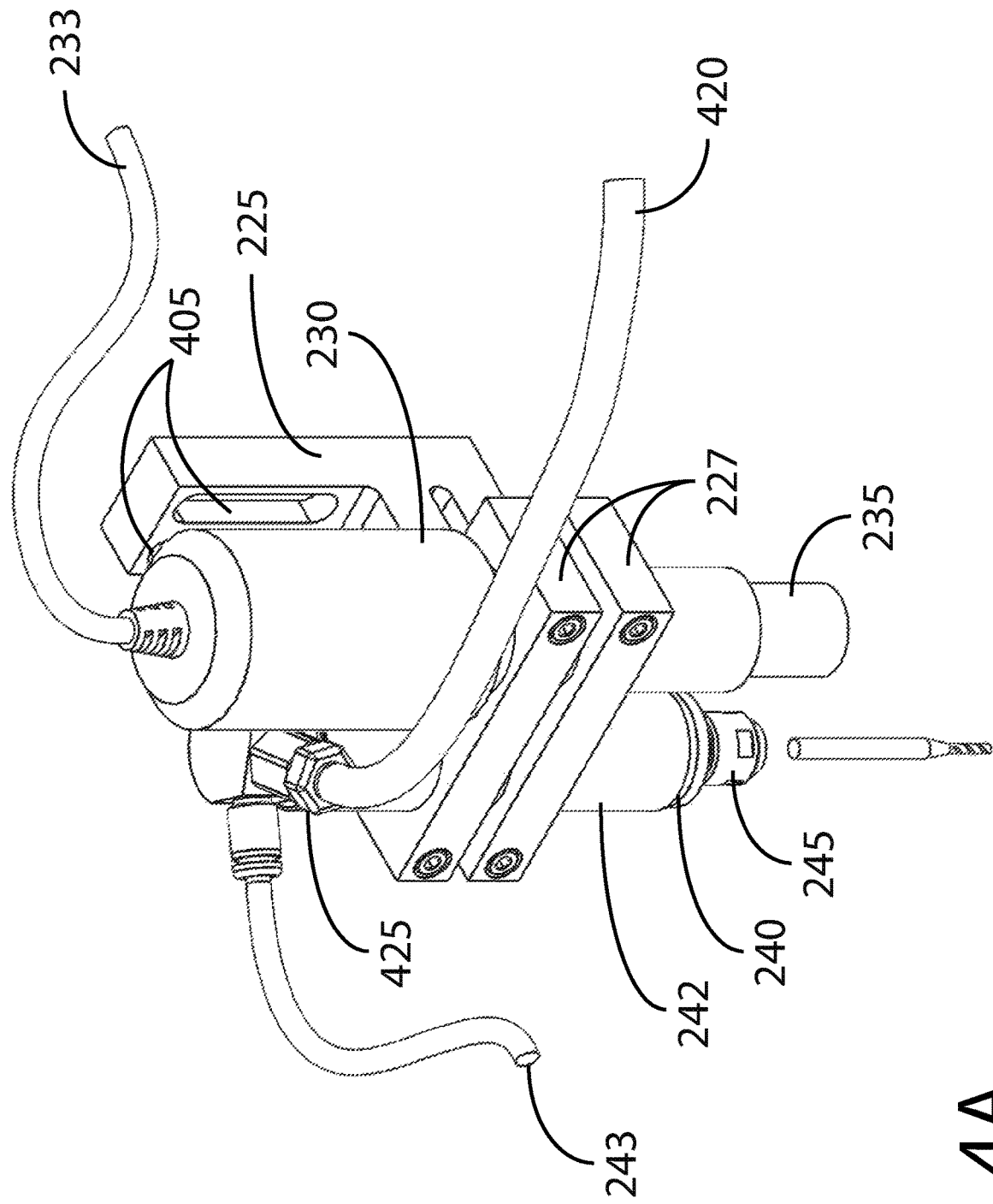
FIG. 4A illustrates the outline detail of the cutting motor, including the mounting and cooling provisions, as well as a camera system.

FIG. 4A illustrates the detail of the mounting of the electric cutting motor and its components seen in FIG. 2A. The mount 225 is designed so that it may be mounted to the three dimensional movement platform in one of several ways. The mount is indexed by two slots 405 so that in one implementation it can be mounted in one of two ways so that it is possible to cut the feature from underneath as well as conventionally from above. Index pins are used and precisely located so that the mount position relative to the motion platform is always repeatable. In another implementation the mount may be mounted in several positions displaced by 90° so that it is possible to cut into a vertical surface. In yet another implementation the mount may be driven by a system that permits any selected angle to be used so that any orientation may be machined. This latter is especially helpful where a cut must be made at a radius in the sample under inspection that would otherwise be inaccessible without considerable set-up and jigging of a sectioned part.

Figure 4B:
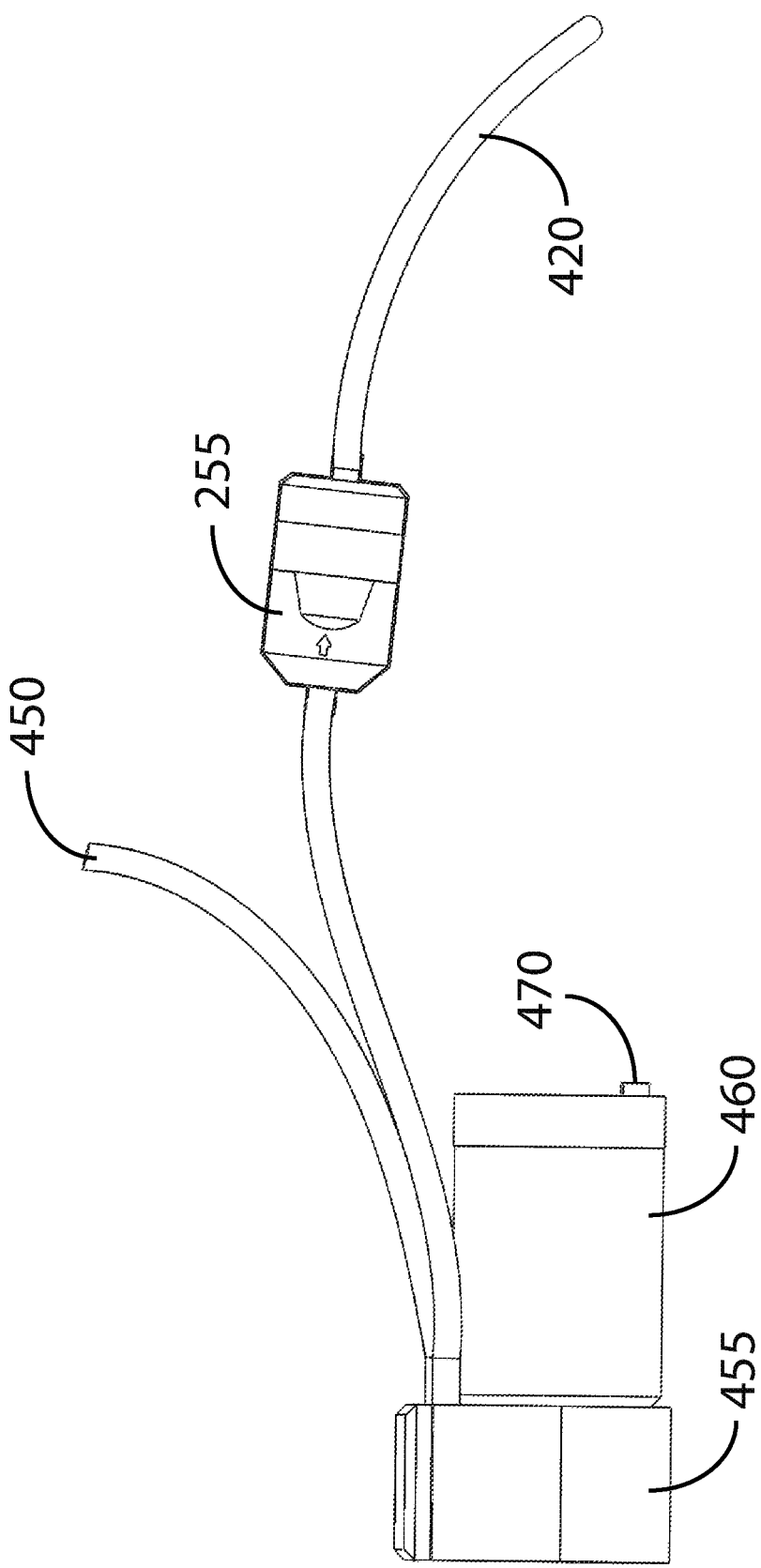
FIG. 4B shows a simple air supply including a pump and filter for cooling air.

The motor shroud 420 has an inlet connection 425 that allows an air supply to be attached. Air flow serves to remove some heat from the motor, but the primary effect is to limit the temperature rise of the shroud. This ensures that an operator does not inadvertently come into contact with a hot part and suffer injury. The air may be taken from a source of compressed air as shown in FIG. 2A or may be derived from a small pump local to the appliance as shown in FIG. 4B. This air is filtered by a filter 255 as seen in FIG. 2A so that moisture, oil and particulates are removed. The filter outlet may be connected to the shroud at the inlet 425 by a flexible pipe 420 and need not be a high pressure connection. A high flow rate is not required and the air may be simply exhausted from the base of the shroud. It may be advantageous if a screen (not shown) is fitted at the shroud base to prevent the ingress of debris or insects when the appliance is not in use. When the appliance is used in an orientation that is favorable to particulate accumulation under gravity, this screen or assembly of screens will help to prevent this. Air may be tapped from the filtered air supply using a simple T-fitting, installed in the flexible pipe or tube, for use elsewhere on the appliance. One implementation bleeds air from this supply and, using a nozzle (not shown) blows it across a lens shroud 235 fitted to the camera to keep debris and contaminants away from the lens surface. Power for the motor 240 is provided through cable 243.

Continuing with FIG. 4A, an optical system comprising a camera 230 (may be used for locating the machining point or start of the feature to be cut. Power and signal transmission is supplied using a cable 233. A simple shroud or lens hood 235 may be attached to the optical system. This hood may be simple, being no more than a shield to reduce extraneous light that may cause shadowing or loss of contrast. A reticule may be physically attached to the hood that allows measurements to be made. Alternatively a computer-generated reticule may operate directly on the resolved image on a computer screen. The hood 235 may be provided with illumination components; in one implementation the illumination is provided by one or more Light Emitting Diodes of various emitted wavelengths or color; by switching power to the diodes then the spectrum of the illumination may be changed from relatively long waves in the near infrared to relatively shorter wavelengths at the blue end of the spectrum. This may be used to advantage depending upon the material to be illuminated and its finish. In this way the illumination may be monochromatic or polychromatic which is beneficial to the camera image because modern image sensors have a working bandwidth that extends well into the infra-red spectrum, the temperature and the temperature profile of some or all of the area of the test sample may be measured and used as part of the analytical measurement data.

FIG. 4B shows an ancillary air system used to provide clean cooling air for the motor and an air blast to protect the camera optical system. Air pump 455 pulls ambient air through a tube 450 and pumps it to filter 255, which air is then distributed to the appliance via tube 420. The pump 455 is driven by an electric motor 460; the power for the motor is delivered using a cable that enters the motor via a cable gland 470.

Figure 5A:
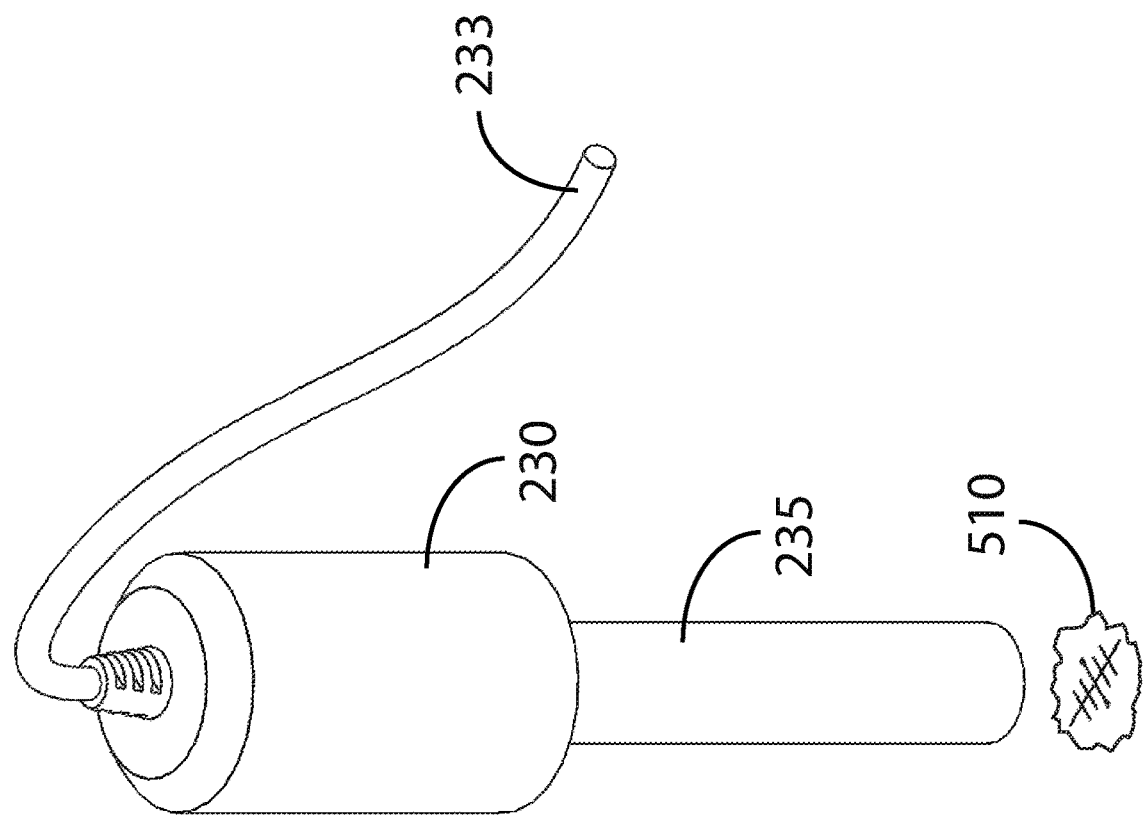
FIGS. 5A and 5B show the camera, its shroud, reticule and illumination devices.
Figure 5B:
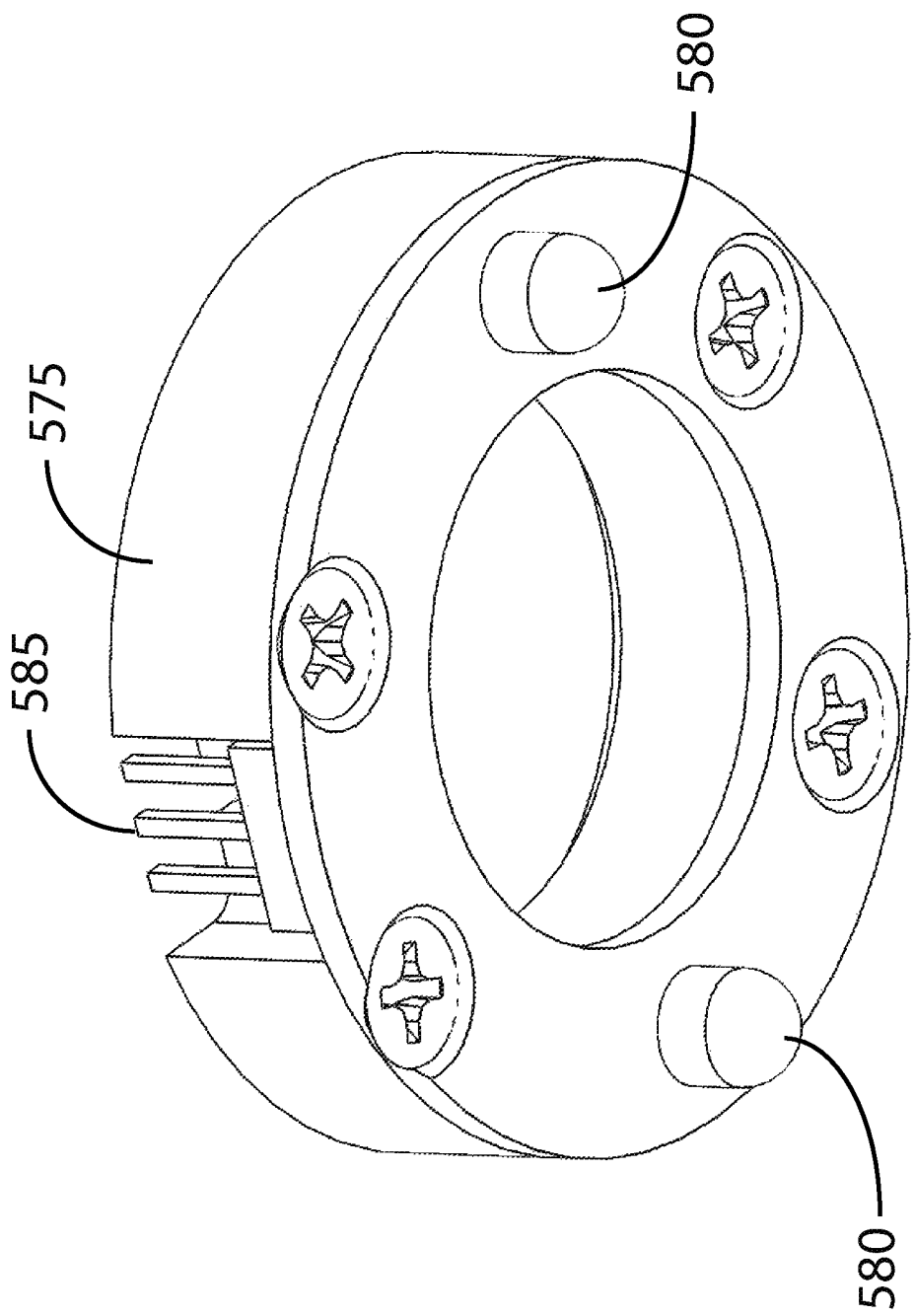

FIG. 5A shows the camera 230, its power and signal cable 233, the shroud 235 and a reticule 510. This reticule is a precision measurement reference and it may be either projected onto the workpiece as suggested by the figure, or else may be engraved onto an insert that is positioned within the shroud so as to give an accurate distance measure for the image. This is a relatively common method that is used in microscopy although, for metallurgical applications, methods such as specular reflection processing are also useful. In one implementation, a computer generated reticule is displayed on the viewing screen where it overlays the workpiece image. FIG. 5B illustrates an illumination device that may be fitted to the camera shroud. The body 575 provides a housing for the illumination components 580. These may be light emitting diodes and can be selected to produce a monochromatic light, polychromatic light or even a selectable range of wavelengths. Power is applied through connector 585 mounted into the body. This means that this illumination component can be simply changed for different versions as required by the application. Modern camera components are highly miniaturized and so it should be clear that it is practical to embed the illumination elements into the camera sensor itself. The resolution of the camera is a design choice as is the illumination method. Camera cleanliness may be assured by taking some of the air supplied to the electric machining motor shroud and directing this as a jet across the camera lens area. This is advantageous when the appliance is aligned so as to allow particulates and debris to fall proximate to the camera as might be the case when the appliance is used to make inverted cuts from underneath a test piece.

Figure 6:
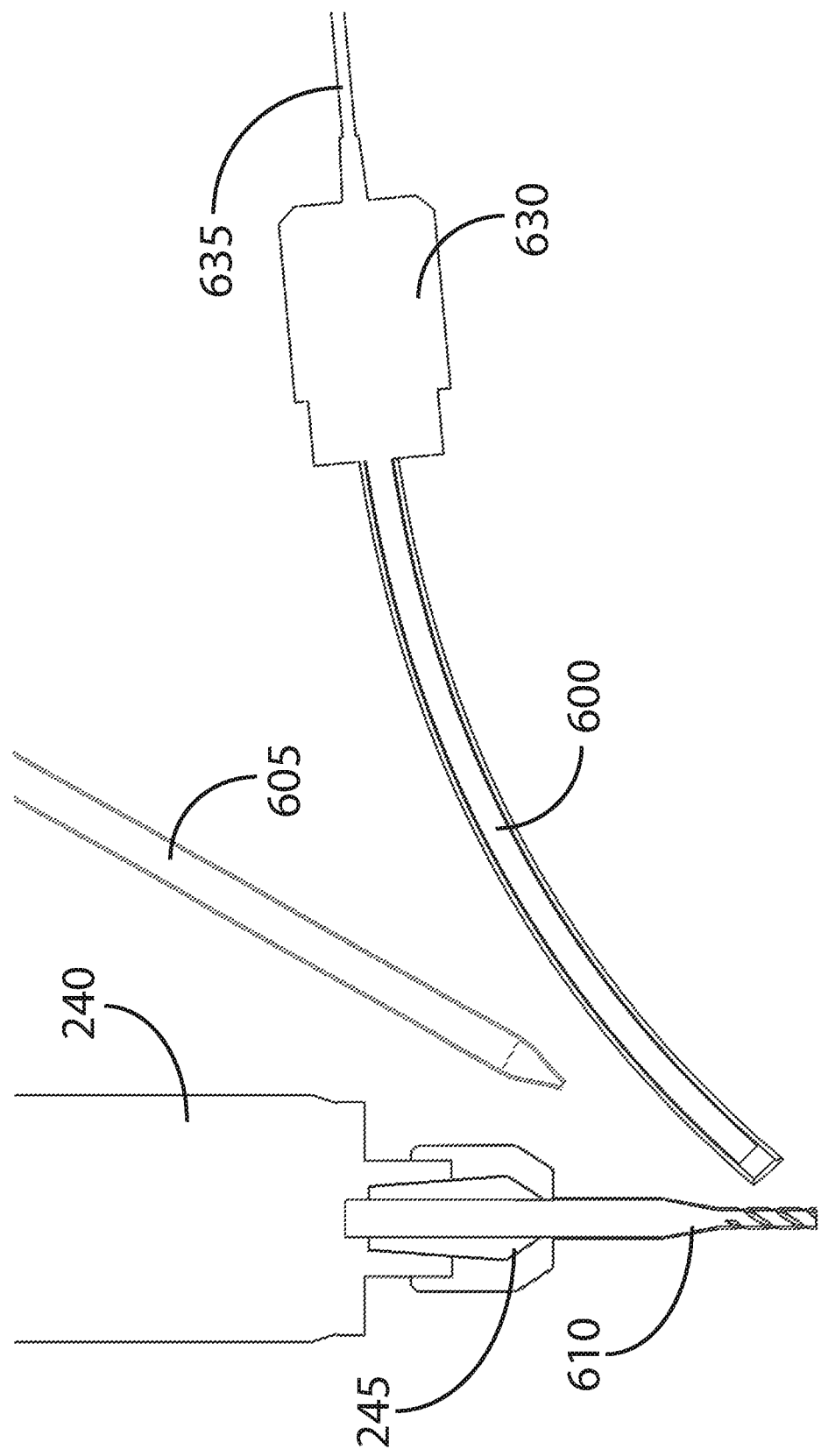
FIG. 6 shows an alternative visual system based on fiber-optic technologies along with an illumination system located proximate to the cutting tool.
Figure 7:
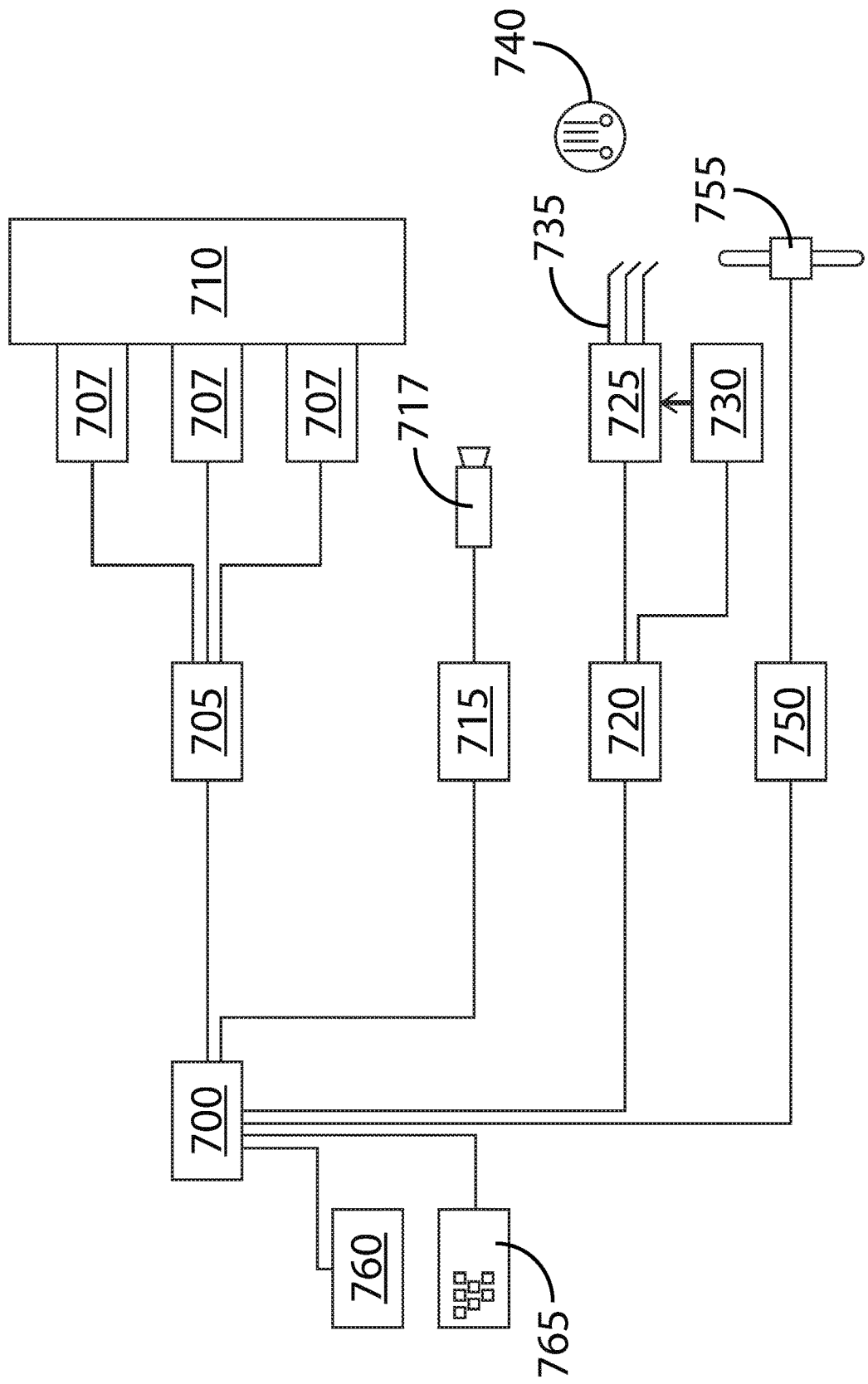
FIG. 7 is a block diagram of the appliance showing the interconnection of the parts of the machine.

In yet another implementation, FIG. 6 shows how a fiber-optic cable 600 may be used, located in close proximity to the cutting tool 610 secured by collet 245 so that the appliance may be positioned directly by the operator. In the same way as an illumination source was used for the camera shroud 235 of FIG. 5A a user selectable monochromatic or polychromatic source may be provided for the target viewing site. It is important to understand that low light operation of a camera necessitates a wide aperture for a lens structure which has the effect of limiting the depth of field. By using a suitable illumination level, the lens aperture may be reduced which results in an improved, or greater depth of field. By using LEDs as the illumination source, good intensity may be achieved without the dissipation exhibited by a typical incandescent source. Further, LEDs offer the considerable advantage of being exceptionally robust and are relatively immune to mechanical shock or abuse.

The use of a fibreoptic cable is also an opportunity to remotely position the illumination source 630, which can also include the camera sensor. By using a partially silvered mirror arrangement to reflect the illumination, the fibreoptic cable puts the illumination directly to the viewing point while the camera sensor sees through the mirror directly to the viewing point. One advantage to this is the reduction of off-axis shadows and the method is comparable to the use of a borescope, found elsewhere in the arts as an inspection device. The ability to deliver high illumination remotely is beneficial because there is no need to position electronic controls and excess wiring in an area where machining is occurring. The reduction in mass at the working point of the motion platform further improves its maneuverability and responsiveness. Although the camera may be the component 230 of FIG. 2A and FIG. 5A, the camera in FIG. 6 enclosed within housing 630 preferably has the partially-silvered mirror as an integrated part of the camera component. Cutting tool 610 is held to the motor 240 by collet 245. Nozzle 605 directs an air blast that is intended to clear machining debris from the region around the cutting tool 610. The fibreoptic cable may be mounted in place of the camera when the camera function is included in the housing 630 or else it may be secured so as to illuminate the required region, if it provides only illumination, in conjunction with a conventional camera.

A block diagram of the system shows a computer 700 connected to the control electronics 705 that manages the drive motors for the motion platform 710. A camera interface 715 couples to a camera system 230 of FIG. 2A (or 500 of FIG. 6 in the case of the integrated camera and fibreoptic cable) so that visual information can be stored and displayed. Precision measurement electronics 720 connect the computer to a probe station 725 and a positioning mechanism 730 is also provided so that the probes 735 may be extended or retracted. The probes are adjustable so that they can be positioned to connect to the strain gauge or gauge array 740 that is being used for the analysis.

In one implementation, a profiling system 750 is provided. In this implementation, a position sensor such as a linear variable differential transducer 755 may be used to trace the surface of the test piece, coupon or sample and this information recorded for subsequent use by the computer in the course of analysis. By way of example, mechanical differences in the profile may be used in conjunction with residual stress differences to determine the effects of geometry on critical parts. A display 760 and a keyboard 765 may be provided for user interface needs. Pointing devices such as a mouse or a trackball as well as specialty interface components such as a joystick, touchscreen or haptic controller may also be provided according to the custom needs of a particular application.

Although a general purpose computing platform such as a laptop or desktop machine may be used, application specific computers offer the ability to completely customize and optimize the appliance. In one implementation, the computer control, measurement and processing is performed in an embedded single card computer using external connections for display monitor and user interface elements. Computer software or firmware determines how user information is input and how it is used to control aspects of the appliance itself.

Figure 8:
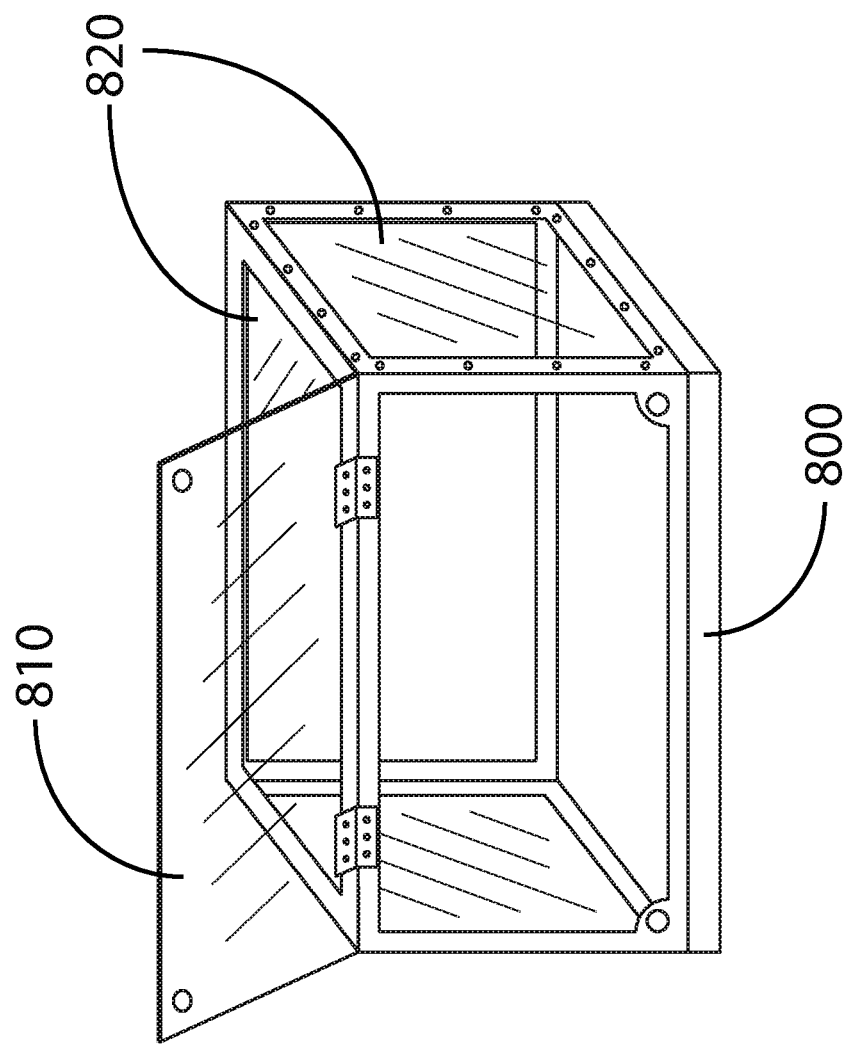
FIG. 8 illustrates a typical protective enclosure for the machine.

In another aspect of the appliance, an enclosure can be provided to protect the system from difficult or dirty working conditions. In addition, the enclosure provides a safety barrier for the user and personnel in the vicinity of the appliance. FIG. 8 illustrates a typical enclosure. The enclosure frame 800 provides the basic strength for the enclosure. One or more doors 810 facilitate access to the appliance. In one implementation, translucent polycarbonate sheets 820 are used for the walls of the enclosure, but these may be replaced by opaque metal walls. The enclosure typically splits into two or three major parts for portable use in the field so that access to the appliance is facilitated, but for fixed use in a laboratory environment this demountability may be less important. The enclosure being modular allows for the design to be easily modified to accommodate large structures which might otherwise not be convenient.

In sum, the present invention provides systems and methods for analysis of material properties of components and structures using machining processes to enable stress relief in the material under test. The advantages of such a system include the ability to improve the state of the art as regards machining accuracy for fixed laboratory use, cut residual stress relief features including all of a hole, an annulus, a slot, and a slit using a single tool without requiring a tool change, enable automated measurement of the material strain condition and be able to be used in remote locations without significantly changing the performance of the apparatus.

While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention.

It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

We claim:

1. A method for measuring residual stress in a component under test having one or more strain gauges mounted along predetermined axes and operationally coupled to a strain measurement system which generates an output proportional to changes in strain as a stress state of the component under test is changed, the method comprising:
   locating a machining appliance and the component under test in appropriate relative positions so that cuts can be made into a surface of the component under test;
   locating a point determined by placement of the one or more strain gauges near which material is to be removed from the component-under-test so that pre-existing residual stress at the point is altered;
   machining a feature starting at the point, and at a predetermined angle relative to the surface upon which the one or more strain gauges is attached, onto the component under test, wherein the machining includes a plurality of light cuts without introducing additional stress from a machining process, so that residual stress in an area proximate to the feature is interrupted from a bulk of the component under test; and
   measuring a change in strain resulting from machining for use in calculation.

2. The method of claim 1 further comprising probing a surface proximate to a region of an intended cut and developing a profile of the region which is recorded.

3. The method of claim 2 wherein probing includes probing using a linear variable differential transducer.

4. The method of claim 2 wherein probing includes probing using an optically enabled and digitally encoded probe.

5. The method of claim 1 wherein the feature is an annulus surrounding the strain measurement component.

6. The method of claim 1 wherein the feature is a slot cut alongside the strain measurement component.

7. The method of claim 1 wherein the measurement system includes a Wheatstone bridge.

8. The method of claim 1 wherein measuring the change in strain includes an optical system using a light source and one or more detectors.

9. The method of claim 8 wherein the light source is selectable to be monochromatic or polychromatic.

10. The method of claim 1 wherein the strain measurement system includes an optical system using a camera and performing digital image correlation to determine the strain change.

11. An appliance for use in residual stress analysis of a component under test (CUT), the appliance comprising:
    a motion platform having two or more mutually orthogonal axes of motion;
    a drive mechanism for each motion axis coupled to a control system;
    a machining tool coupled to the control system, wherein the tool is configured to machine a plurality of light cuts in a component under test (CUT) without introducing additional stress from a machining process, so that residual stress in an area proximate to a machined feature of the component under test is interrupted from a bulk of the CUT, thereby preparing the area proximate to the machined feature for locating a sensor configured to measure strain or displacement of the area proximate to the machined feature of the component under test in response to the residual stress being interrupted from the bulk of the CUT;
    an adjustable motor mount for positioning the minimum cutting height of the machining tool;
    a camera having a viewing area orthogonal to a cutting axis and fixed relative to this axis; and
    wherein the control system includes a processor and interface enabling the entry and execution of operational instructions and parameters, a display of camera images, and the calculation and storage of measured and derived information.

12. The system of claim 11 having a reticule for measuring distance at the viewing area.

13. The system of claim 12 wherein the reticule is generated electronically and overlaid on a displayed image.

14. The system of claim 11 wherein a hood is fitted to a lens of the camera includes one or more selectable light sources for illuminating the viewing area with monochromatic or polychromatic.

15. The system of claim 14 wherein the light sources are light emitting diodes and include wavelengths in the near infrared.

16. The system of claim 11 wherein one axis controls a cutting depth.

17. The system of claim 11 having a probe station to allow automatic connection to a strain gauge or an array of gauges.

18. The system of claim 17 wherein probes of the probe station may be retracted independently of the operation of the motion platform.

19. The system of claim 11 wherein the machined feature is a slot.

20. The system of claim 11 wherein the machined feature includes one or more optional shapes corresponding to preprogrammed operations conditioned on the entry of dimensional data.

21. The system of claim 20 wherein the one or more optional shapes include a hole, an annulus, a slot, a slit, an ellipse, a rectangle, or a plus sign.

22. The system of claim 11 wherein adjustable feet are provided for angular adjustment of the cutting tool relative to the area to be machined.

23. The system of claim 11 wherein a profiling probe is mounted so that the component under test may be automatically mapped.

24. The system of claim 23 wherein the mapped profile is used to adjust or direct the drive mechanism to enable the machined feature to be adjusted based on the profile of a surface of the component under test.

25. The system of claim 11 wherein the machining tool includes a high speed motor fitted with a collet or chuck assembly for holding a drilling, milling or cutting tool.

26. The system of claim 11 wherein the machining tool utilizes electric discharge machining.

27. The system of claim 11 wherein the machining tool utilizes laser ablation.

28. The system of claim 11 wherein the camera and the machining tool are permanently fixed and require no manual adjustment during testing.

29. The system of claim 11 wherein the sensor is a strain gage.

30. The system of claim 11 wherein the sensor is a displacement gage.

31. The system of claim 11 wherein the sensor uses optical methods for strain or displacement measurement including one or more of digital image correlation, and interferometry.

32. The system of claim 11 wherein the machined feature is positioned relative to the sensor.

33. The system of claim 11 wherein the machined feature includes at least two steps along a vertical axis.

34. The system of claim 11 wherein the at least two steps are non-linear dimensionally with respect to each other.

35. The system of claim 11 wherein the machined feature is positioned using optical feature recognition.

\* \* \* \* \*

(12) EX PARTE REEXAMINATION CERTIFICATE (12158th)
United States Patent
DeWald et al.

(10) Number: US 10,900,768 C1
(45) Certificate Issued: Oct. 24, 2022

(54) SYSTEMS AND METHODS FOR ANALYSIS OF MATERIAL PROPERTIES OF COMPONENTS AND STRUCTURES USING MACHINING PROCESSES TO ENABLE STRESS RELIEF IN THE MATERIAL UNDER TEST

(71) Applicant: Hill Engineering, LLC, Rancho Cordova, CA (US)

(72) Inventors: Adrian T. DeWald, Sacramento, CA (US); Michael R. Hill, Davis, CA (US); Eric Summer, Sacramento, CA (US); Brett Watanabe, Sacramento, CA (US); Teresa Wong, Sacramento, CA (US)

(73) Assignee: HILL ENGINEERING, LLC

Reexamination Request:
No. 90/020,142, Dec. 8, 2021

Reexamination Certificate for:
Patent No.: 10,900,768
Issued: Jan. 26, 2021
Appl. No.: 16/201,994
Filed: Nov. 27, 2018

Related U.S. Application Data

(60) Provisional application No. 62/592,240, filed on Nov. 29, 2017.

(51) Int. Cl.
*G01B 7/16* (2006.01)
*G01L 5/00* (2006.01)
*G01L 1/22* (2006.01)
*G01N 3/00* (2006.01)
*G01L 1/00* (2006.01)

(52) U.S. Cl.
CPC .............. *G01B 7/18* (2013.01); *G01B 7/16* (2013.01); *G01L 1/22* (2013.01); *G01L 5/0047* (2013.01); *G01N 3/00* (2013.01); *G01L 1/00* (2013.01); *G01N 2203/0069* (2013.01)

(58) Field of Classification Search
None
See application file for complete search history.

(56) References Cited

To view the complete listing of prior art documents cited during the proceeding for Reexamination Control Number 90/020,142, please refer to the USPTO's Patent Electronic System.

*Primary Examiner* — William C Doerrler

(57) ABSTRACT

Analysis of residual stress in materials is often done in static conditions in a laboratory. Accurate systems and methods for performing these analyses in a dynamic, non-laboratory environment are notoriously difficult and can be very inaccurate. A method using a portable, field deployable apparatus having greater accuracy than currently available is disclosed whereby accurate and repeatable residual stress analysis may be implemented in non-laboratory environments leading to greatly improved diagnostics, maintenance and life limit prediction.

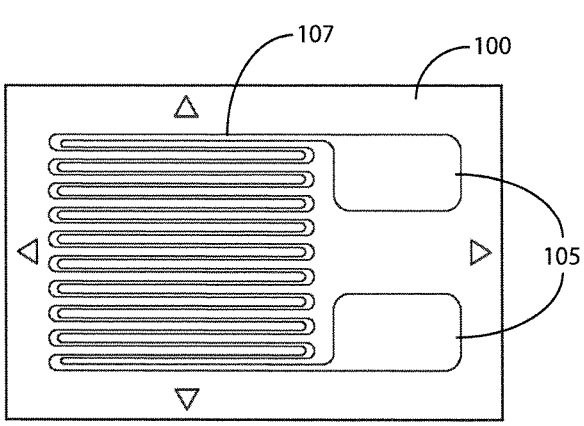
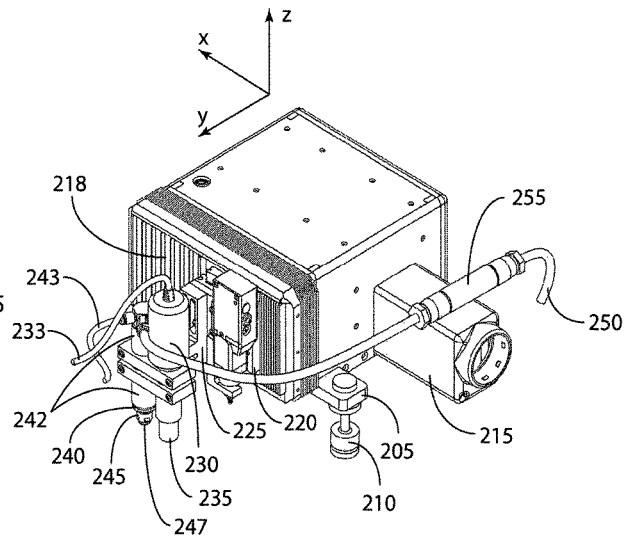

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-10 are cancelled.

Claim 11 is determined to be patentable as amended.

Claims 16, 19, 22, 26 and 28-34, dependent on an amended claim, are determined to be patentable.

New claim 36 is added and determined to be patentable.

Claims 12-15, 17, 18, 20, 21, 23, 24, 25, 27 and 35 were not reexamined.

11. An appliance for use in residual stress analysis of a component under test (CUT), the appliance comprising:
   a motion platform having two or more mutually orthogonal axes of motion;
   *a camera, mounted to the motion platform, having a viewing area orthogonal to a cutting axis of a drilling, milling, or cutting tool, and having a fixed offset relative to the cutting axis;*
   a drive mechanism for each motion axis coupled to a control system, *wherein the drive mechanisms are operable,*
      *to cause the drilling, milling, or cutting tool, under control of the control system, to machine a feature, based at least in part upon a machining point on a component under test (CUT) identified using the camera and upon the fixed offset, and*
      *to position the camera to use one or more reference points identify the machining point on the CUT;*
   a machining tool *mounted to the motion platform and coupled to the control system,*
   wherein the *machine* tool is configured to machine a plurality of light cuts in a [component under test (] CUT[)] without introducing additional stress from [a] *the* machining process, so that residual stress in [an] *the* area proximate to [a] *the* machined feature of the [component under test] *CUT* is interrupted from a bulk of the CUT, thereby preparing the area proximate to the machined feature for locating a sensor configured to measure strain or displacement of the area proximate to the machined feature of the [component under test] *CUT* in response to the residual stress being interrupted from the bulk of the CUT;
   *wherein the machining tool includes a motor that includes a motor spindle and that is fitted with a collet or chuck assembly for holding the drilling, milling or cutting tool;*
   an adjustable motor mount for positioning the minimum cutting height of the machining tool;
   [a camera having a viewing area orthogonal to a cutting axis and fixed relative to this axis;] and
   wherein the control system includes a processor and interface enabling the entry and execution of operational instructions and parameters, a display of camera images, and the calculation and storage of measured and derived information, *wherein the parameters include an offset calibration factor that indicates a position of the camera relative to one or more reference points when the camera identifies the machining point.*

*36. The system of claim 11 wherein the drive mechanism is manually operable to align the camera with the machining point.*

\* \* \* \* \*